United States Patent [19]

McGrath et al.

[11] Patent Number: 5,923,002

[45] Date of Patent: Jul. 13, 1999

[54] ACOUSTICAL ROOM PANELING AND METHOD OF INSTALLATION

[75] Inventors: Ralph D. McGrath; Harry A. Alter, both of Granville; Jeffrey A. Tilton, Newark; Robert O. Kaufman, Johnstown, all of Ohio

[73] Assignee: Owens Corning Fiberglas Technology, Inc., Summit, Ill.

[21] Appl. No.: 08/969,132

[22] Filed: Nov. 12, 1997

[51] Int. Cl.⁶ .......................................................... E04B 1/82
[52] U.S. Cl. ............................................. 181/290; 181/295
[58] Field of Search .................................... 181/286, 290, 181/291, 294, 295, 30

[56] References Cited

U.S. PATENT DOCUMENTS

| | | |
|---|---|---|
| D. 376,754 | 12/1996 | Livingston et al. . |
| 2,081,765 | 5/1937 | Prudden . |
| 2,692,219 | 10/1954 | Slayter et al. . |
| 3,381,438 | 5/1968 | Bohnsack . |
| 3,440,786 | 4/1969 | Weaver . |
| 3,477,684 | 11/1969 | Dagiel . |
| 3,591,993 | 7/1971 | Reeves . |
| 3,712,846 | 1/1973 | Daniels et al. . |
| 3,721,050 | 3/1973 | Perina . |
| 3,871,153 | 3/1975 | Birum, Jr. . |
| 3,971,867 | 7/1976 | Randall . |
| 3,977,492 | 8/1976 | Hankel ...................................... 181/290 |
| 4,100,709 | 7/1978 | Good . |
| 4,111,081 | 9/1978 | Hilliard . |
| 4,149,352 | 4/1979 | Allen . |
| 4,158,936 | 6/1979 | Fulton . |
| 4,213,516 | 7/1980 | Sulewsky . |
| 4,353,193 | 10/1982 | Sanderson . |
| 4,461,135 | 7/1984 | Anderson et al. . |
| 4,581,869 | 4/1986 | Reuter . |
| 4,622,797 | 11/1986 | Wuster . |
| 4,661,392 | 4/1987 | Kapstad . |
| 4,719,730 | 1/1988 | Winkowski . |
| 4,736,559 | 4/1988 | Young . |
| 4,788,806 | 12/1988 | Sease . |
| 4,926,963 | 5/1990 | Snyder . |
| 5,117,598 | 6/1992 | Livingston et al. . |
| 5,214,892 | 6/1993 | Livingston et al. . |
| 5,396,750 | 3/1995 | Kleyn . |
| 5,398,471 | 3/1995 | Spagnolo . |
| 5,606,833 | 3/1997 | Andersson . |
| 5,606,841 | 3/1997 | Carter, Jr. . |
| 5,665,447 | 9/1997 | Greaves et al. ........................ 181/290 |

*Primary Examiner*—Khanh Dang
*Attorney, Agent, or Firm*—Curtis B. Brueske; Stephen W. Barns

[57] ABSTRACT

An acoustical diffuser is disclosed for diffusing sound. A preferred diffuser includes a first fibrous material, a first separator layer, a diffuser material a second separator layer, a second fibrous material and an acoustically transparent material. The subject invention also includes a preferred method of molding such diffuser. The subject invention further includes a panel that has an acoustically reflective side and an acoustically transparent side over a frequency range that can be attached to the walls of a room to enhance the acoustical characteristics of the room. A preferred method of installing such panels includes installing fabric retainer members to the walls between the panels and attaching an acoustically transparent material to the fabric retainer members such that the panels and fabric retainers are covered by the acoustically transparent material. The panels may preferably be arranged such that acoustically reflective surfaces on one wall oppose acoustically absorptive surfaces on another opposing wall. Preferably, panels are attached to the walls such that the acoustically absorptive surfaces thereof are facing the room interior where the walls abut each other to form corners. An acoustical built-in wall system and an acoustical door and method of applying an acoustical treatment to a door are also disclosed.

6 Claims, 19 Drawing Sheets

ACOUSTICAL ROOM PANELING AND METHOD OF INSTALLATION

PRIORITY INFORMATION

This application is a continuation-in-part of U.S. patent application Ser. No. 08/871,021 filed Jun. 6, 1997.

TECHNICAL FIELD AND INDUSTRIAL APPLICABILITY OF THE INVENTION

The present invention relates to acoustical panels and sound attenuation devices and, more particularly, is directed to acoustical or sound absorbing and insulating materials and methods for manufacturing and installing such materials to enhance the acoustical performance of an enclosed space.

BACKGROUND OF THE INVENTION

Perhaps ever since Thomas Alva Edison invented the phonograph in 1876, man has attempted to control the transmission of sound to his advantage. Today, the need for sound control can be found in a variety of different environments and settings. For example, office buildings, doctor's offices, recording studios, home theaters, etc. generally employ various types of materials for preventing the unwanted transmission of sound.

Acoustics is defined as the science that deals with the production, control, transmission, reception and effects of sound. When considering the problem of noise control, one must differentiate between sound absorption, sound insulation, sound reflection and sound diffusion. Sound absorption refers to the attenuation of reverberant noise within the same room or area as the noise source. The sound absorption coefficient of a material is a measure of its ability to absorb noise efficiently. For example, a material that absorbs 100% of the sound energy striking it has a sound absorption coefficient of one.

Sound insulation refers to the reduction of noise being transmitted from one area into another area. The "Sound Reduction Index" or "Transmission Loss" of building elements are terms which described the resistance of that element to airborne sound transmission. The following table compares the degree of acoustic privacy with the sound reduction index:

| Sound Reduction Index | Hearing Conditions |
| --- | --- |
| 35 dB or less | Normal speech can be understood quite easily and distinctly through the walls. |
| 35 to 40 dB | Loud speech can be understood fairly well. Normal speech can be heard but not easily understood. |
| 40 to 45 dB | Loud speech can be heard, but is not easily intelligible. Normal speech can be heard only faintly, if at all. |
| 45 to 50 dB | Loud speech can be faintly heard but not understood. Normal speech is inaudible. |
| 55 dB or greater | Very loud sounds, such as loud singing, brass musical instruments or a radio at full volume can be heard faintly or not at all. |

Sound reflection refers to transmission of sound in another direction by virtue of the sound bouncing off of a non-sound absorbing surface. The sound reflection coefficient of a material is the ratio of the amount of reflected sound energy to that of the incident sound energy striking the material. When tested for sabine absorption in a reverberation room, an absorption coefficient of 0.20 will generally result in a reflection coefficient of 0.90.

Sound diffusion is the uniform distribution or scattering of sound by controlled reflection. This is particularly important in home theaters to ensure that "surround sound" effects are not specifically localized thus producing the unwanted perception of "sound from a box". Thus, to prevent such sound localization, it is desirable to diffuse, or control the reflection of, the sound energy in a range of frequencies.

Over the years, a variety of different materials and apparatuses have been developed for controlling the transmission and absorption of sound based on the foregoing principles. Different forms of acoustical panels have been used in making furniture, room dividers, partitions, wall constructions, ceiling constructions and the like. For example, U.S. Pat. No. 2,081,765 to Prudden discloses an acoustical structure that is generally loosely attached to a wall for preventing the transmission of sound therethrough. Such structure, however, can be difficult and time consuming to install. Because such structure is loosely attached to the wall, it offers no structural support to the wall. Furthermore, such structure cannot be provided in complex surface geometries designed for the advantageous absorption and reflection of sound.

Another acoustical panel is disclosed in U.S. Pat. No. 3,712,846 to Daniels et al. While the Daniels et al. panel includes a rigid main body, the flexible outer covering includes a plurality of projections and indentations that can trap dirt and debris making it difficult to keep clean. Furthermore, such irregular surface may not be aesthetically desirable. Other embodiments in the Daniels et al. panel employ a woven outer covering that may also have similar shortcomings. Other panels which have desirable structural characteristics are disclosed in U.S. Pat. No. 2,692,219 to Slater et al. However, such panels are not well-adapted to be formed with complex geometric surfaces.

U.S. Pat. No. 4,661,392 to Kapstad discloses a sound dampening panel that includes a corrugated center barrier that is sandwiched between fibrous sound dampening material. The sound dampening material is housed within a frame and is covered with a fabric material. Such panel is intended to be used as a partition panel, and thus is not well-suited for attachment to structures such as ceilings, walls, etc.

Another panel structure is disclosed in U.S. Pat. No. 5,606,833 to Andersson. The panel comprises a rigid support sheet that has an insulating sheet attached thereto. Anderson teaches that the insulating sheet of each panel is placed inwardly and not exposed.

U.S. Pat. No. 4,719,730 to Winkowski discloses a demountable partition wall that includes a sound absorbing tack board including a gypsum baseboard, a mineral fiber core board and a porous decorative sheet of material adhered to the core board. The tack board is hung such that the core board faces toward sound and absorbs it.

Decoustics, a company located in Toronto, Canada, also manufactures assorted types of wall panels and ceiling tiles that provide various acoustical properties. Such panels and tiles, however, are not well-adapted for being formed with a variety of geometric surfaces. Thus, in general, many previously proposed acoustical panel constructions are less desirable because they are either too expensive to produce economically, provide poor performance and/or are difficult to install and maintain.

Yet another panel arrangement is disclosed in U.S. Pat. No. 5,606,841 to Carter, Jr. The panels disclosed in that patent comprise interior filled wall panels that include a framed backing member to which an outer sheet material is attached. A filler or padding material that may have desirable thermal or acoustical properties is retained between the backing member and the sheet material. The sheet material is secured through the filler material in a plurality of spaced locations to create a three dimensional surface relief.

U.S. Pat. No. 3,721,050 to Perina discloses a modular grid panel retention system that can be used to cover the walls and/or ceiling surfaces of a room. The system includes 4'×8' grid-like sections which may be fastened to the wall, ceiling or support structure by screws, bolts or hook and loop-type fasteners. Each grid-like section includes a plurality of panel receiving cavities for receiving wall panels, ceiling tiles and the like therein. The grid-like structures disclosed in this patent can be cumbersome to handle and install. In addition, the numerous exposed frame portions of each grid-like section can provide undesirable sound reflection in rooms requiring enhanced acoustical properties.

In environments wherein precisely controlled sound quality is required, such as in recording studios, acoustical "traps" are commonly employed. Acoustical traps, such as those sold by Acoustic Sciences Corporation, typically comprise free standing devices that are located in predetermined locations within the room to control the absorption of unwanted sound and acoustically "tune" the room. While those devices may be relatively effective at providing a room with desired acoustical attributes, they are expensive and occupy valuable room space.

The above-mentioned panels and devices, due to their cost, have not been embraced by the residential market. Homeowners desiring to acoustically tune a room to enhance the sound performance of their stereo systems usually are prevented from doing so due to the relatively high costs associated with purchasing and installing such materials and devices. Furthermore, there is no simple system available for the homeowner to determine a desirable layout of such materials and apparatuses.

Thus, there is a need for an acoustical diffuser panel that is relatively inexpensive to manufacture and install.

There is another need for an acoustical panel that can be fabricated with complex outer surface geometries.

There is still another need for an acoustical panel that has desirable structural properties that enable the panel to be fabricated in large sizes.

There is yet another need for an acoustical panel that is relatively lightweight, easy to maintain and that has aesthetically desirable characteristics.

Another need exists for a method of installing panels having the above-mentioned desirable characteristics that enables an enclosed area to be acoustically tuned and acoustically isolated from adjoining areas.

There is yet another need for acoustical wall and ceiling treatments that can be installed to accommodate built-in components such as speakers, diffusers, etc.

There is a need for an acoustical panel and wall treatment system that can easily be incorporated into new construction or retrofitted into existing structures.

Another need exists for acoustical wall and ceiling treatments that have the attributes mentioned above that is customizable in terms of texture and color.

Another need exists for aesthetic, acoustical built-in wall systems.

There is still another need for an acoustical treatment that can be used on existing doors and access covers present in a room.

SUMMARY OF THE INVENTION

In accordance with a preferred form of the present invention, there is provided an acoustical diffuser for diffusing sound in a predetermined manner, including: a back board; a first fibrous material having first and second sides, the first side being attached to a side of the back board and the second side defining a preferred contour; a first separator layer having first and second sides, the first side attached to the second side of the first fibrous material; a diffuser material having first and second sides, the first side attached to the second side of the first separator layer; a second separator layer having first and second sides, the first side attached to the second side of the diffuser material; a second fibrous material having first and second sides, the first side attached to the second side of the second separator member; and an acoustically transparent member attached to the second side of the second fibrous material.

The subject invention includes a method of fabricating an acoustical diffuser panel comprising the steps of inserting a composite between openable and closable mold halves of a heatable mold, wherein at least one of the mold halves has a predetermined contour and wherein the composite includes a backing board, a first fibrous material having binder thereon, first and second separator layers, a second fibrous material having binder thereon, and an acoustically transparent member; closing the mold halves to compress and heat the composite for a first predetermined time period such that at least a portion of the composite assumes the contour; opening the mold halves upon the expiration of the first predetermined time period; inserting a diffuser material between the first and second separator layers; closing the mold halves to compress the diffuser material between the first and second separator layers for a second predetermined time period to form a unitary panel; and opening the mold halves upon the expiration of the second predetermined time period to permit said unitary panel to be removed from the mold.

The subject invention also includes an acoustical panel, including a backing board having at least one acoustical surface that is acoustically reflective over a first frequency range; a material that is acoustically absorptive over the first frequency range, the material attached to the backing board such that the at least one acoustically reflective surface of the backing board is exposed; and an acoustically transparent material attached to a surface of the acoustically absorptive material.

The subject invention also includes an acoustical panel comprising a backing board; a first material attached to a side of the backing board, the first material being acoustically absorptive over a first frequency range; a second material attached to another side of the backing board, the second material being acoustically absorptive over the sound at the first frequency range; and an acoustically transparent material attached to at least one of the first and second acoustically absorptive materials.

The subject invention also includes a method for enhancing the acoustical performance of an enclosed space that defines an interior and that has at least one interior-facing surface, the method comprising the steps of installing at least one first interior-facing panel surface on the interior-facing surface of the enclosed space, the first panel surface having a first acoustical characteristic; and installing at least one second interior-facing panel surface on the interior-facing surface of the enclosed space, the second panel surface having a second acoustical characteristic that differs from the first acoustical characteristic.

The subject invention also includes an acoustical room having an interior, comprising at least one first wall facing the interior; and a plurality of two-sided panels attached to the wall, each the panel having a first side that is acoustically reflective over a first frequency range and a second side that is acoustically reflective over the first frequency range, such that the first side of at least one panel faces the interior and the second side of at least another panel faces the interior.

The subject invention also includes an acoustical door, comprising a frame member defining a door perimeter operably attachable to a door frame; a panel member received within the frame member, the panel member having a first acoustical surface that is acoustically reflective over a first frequency range and a second acoustical surface that is acoustically absorptive over the first frequency range; and an acoustically transparent material attached to the frame member and covering the panel member.

The subject invention also includes a method for applying an acoustical treatment to a door having a frame member defining a door perimeter and an interior-facing skin and an exterior-facing skin attached to the frame member to define a hollow cavity within the door, the method comprising the steps of removing at least a portion of the interior-facing skin to expose the hollow cavity within the door; attaching a retainer member to the frame member along an inner perimeter of the frame member; inserting a panel having at least one acoustical surface which is acoustically absorptive over a frequency range, into the hollow interior of the door, the panel being arranged such that the acoustical surface is interior-facing; and attaching an acoustically transparent member to the retainer member such that the acoustically transparent member covers the panel and the hollow interior of the door.

The invention also includes an acoustical built-in wall system for mounting components such as audio and video components in a wall having desired acoustical characteristics, including a supporting wall structure and a plurality of acoustical panels mounted to the wall structure. At least one of the panels presents a surface that is acoustically reflective over a first frequency range and at least another of the panels presents a surface that is acoustically absorptive over the first frequency range. At least one of the panels has a cutout therein to expose, at least acoustically or visibly, a component.

It is a feature of the present invention to provide a diffuser panel that is economic to fabricate and easy to install.

It is a further feature of the present invention to provide an economical method of fabricating diffuser panels with the above-mentioned attributes.

It is still another feature of the present invention to provide acoustical panels that have an acoustically absorptive surface and an acoustically reflective surface that are easy to manufacture and install.

Yet another feature of the present invention is to provide a method for acoustically tuning an enclosed space such as a room.

Another feature of the present invention is to provide a method for applying an acoustical treatment to a door or access panel.

Another feature of the present invention is to provide an acoustical built-in wall system for mounting components such as audio and video components in a wall having desired acoustical characteristics.

Accordingly, the present invention can provide solutions to the problems discussed above. These and other details, objects and advantages will become apparent as the following detailed description of the present preferred embodiment thereof proceeds.

BRIEF DESCRIPTION OF THE DRAWINGS

In the accompanying drawings, there are shown present preferred embodiments of the invention wherein like reference numerals are employed to designate like parts and wherein.

DETAILED DESCRIPTION OF THE PREFERRED EMBODIMENTS

Figure 1:
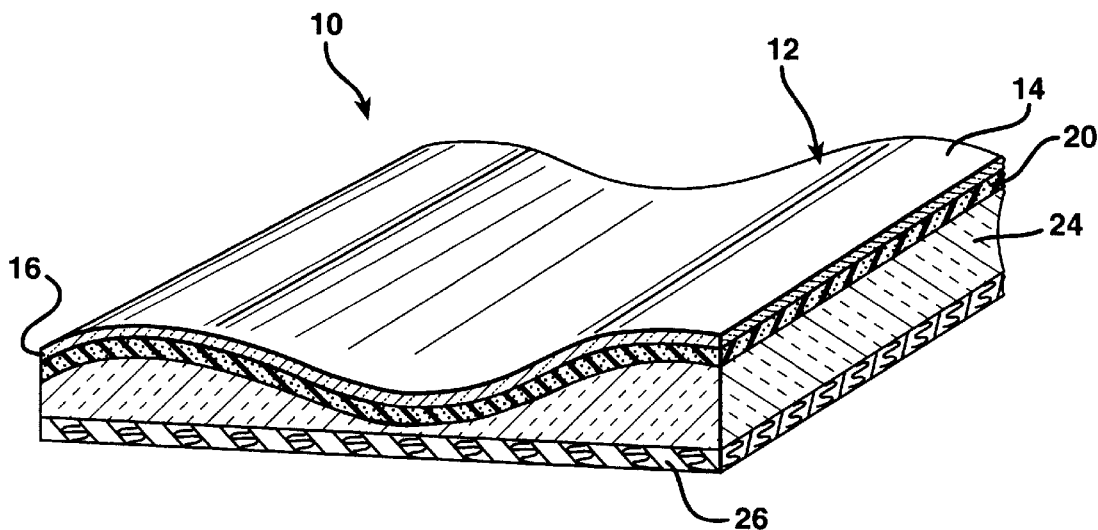
FIG. 1 is a perspective view of a preferred diffuser panel of the subject invention with some of the elements thereof omitted for clarity.

Referring now to the drawings for the purposes of illustrating the present preferred embodiments of the invention only and not for purposes of limiting the same, FIG. 1 illustrates a preferred acoustic diffuser panel 10 of the present invention. While FIG. 1 depicts a diffuser panel 10 that has a wavy outer surface 12, the skilled artisan will readily appreciate from the discussion to follow that the diffuser panel 10 of the present invention can be provided with a myriad of complex outer surface geometries for advantageously diffusing sound in a desired manner. Those of ordinary skill in the art will also appreciate that such surface geometries are dependent upon the characteristics of the specific environment into which it is to be installed (i.e., room size, room shape, internal and external sounds, etc.). With the appropriate outer surface geometry, sound can be evenly scattered from the outer surface 12. Such effect significantly enhances the sound image quality of an enclosed area and serves to increase the perceived sense of space (i.e., virtual size) of the area. As used herein, "sound diffusion" means the uniform distribution or scattering of sound independent of the direction of the sound from a source (e.g., a speaker).

Figure 2:
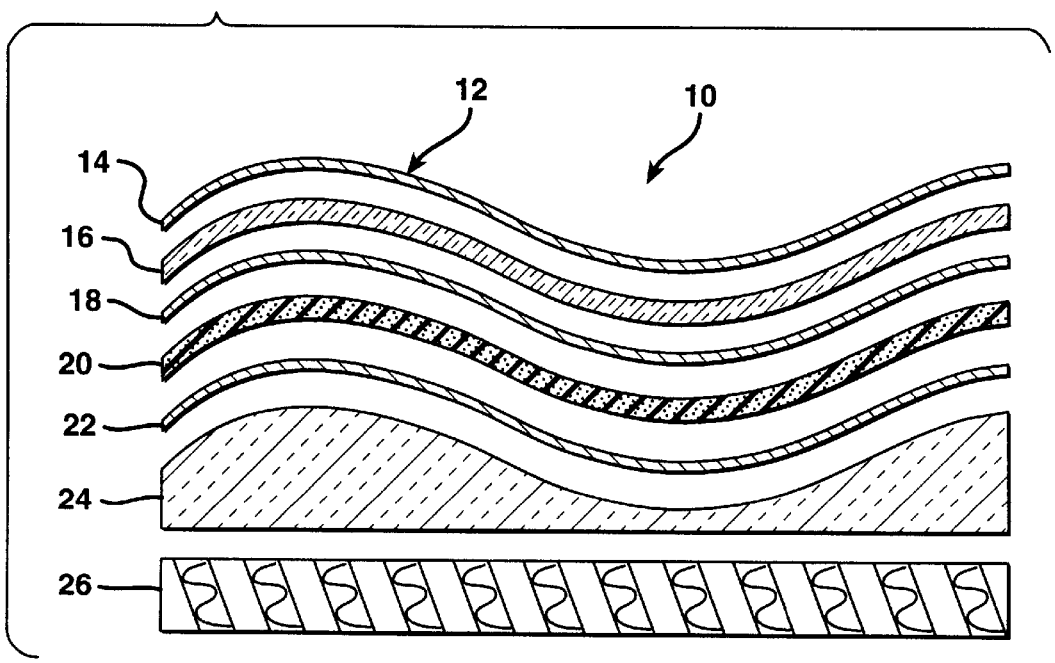
FIG. 2 is an exploded assembly view of the diffuser of FIG. 1.

A preferred panel 10 of the subject invention is preferably fabricated utilizing a molding/lamination method that is described below. FIG. 2 is an exploded view of a preferred diffuser panel construction. As can be seen in that Figure, the panel 10 preferably comprises a composite of materials, one of which is an acoustically transparent surface finishing material 14 that preferably comprises a fabric material. The surface finishing material 14 is preferably impregnated with an uncured binder such as a thermoset polymer material which preferably has a curing temperature of approximately 400° F. (204° C.). However, surface finishing material 14 could also comprise other acoustically transparent glass mat or other similar material that is impregnated with a similar binding medium or adhesive medium. As used herein, "acoustically transparent material" is a material whose acoustical properties when applied to a primary product will not affect the acoustical properties exhibited by the primary product.

The next layer of material preferably comprises a first molding media 16. Such molding media preferably comprises a moldable fibrous material impregnated with a binder, such as the fiberglass material manufactured by Owens Corning under the general product description of molding media. It will be appreciated that such fiber glass material provides added advantages of structural strength and rigidity. However, other organic and inorganic materials such as open-celled melamine foam or rockwool could also be successfully employed. The next layer of material preferably comprises a first foil layer 18, such as the foil manufactured by Lamtec of New Jersey under Model No. 3035; however, other material such as aluminum foil fabricated by Reynolds Aluminum may also be used.

The next layer 20 of material functions as a diffuser material and preferably comprises asphalt material having a preferred weight of 1.5 pounds per square foot and a preferred softening point of approximately 150–180° F. (64–82° C.). Although the acoustical characteristics of any laminate depend upon the arrangement, thicknesses and masses of the component layers, layer 20 is termed a diffuser material becuase its high density makes it the primary contributor to the acoustically reflective properties of the panel 10 that enable diffusion of sound. The next layer 22 of material preferably comprises a second layer of foil of the type described above. Layer 24 preferably comprises a second molding media such as the moldable fiberglass of the type described above. The last layer 26 of the panel 10 preferably comprises a preformed fibrous backing material such as a medium density fiberglass material or an open-celled melamine. It will be apparent to the skilled artisan that by incorporating various layers of different densities over a controlled radius profile, the present diffuser creates a diffuse sound field that scatters sound in a wide range of frequencies to avoid undesirable sound image localization.

Figure 3:
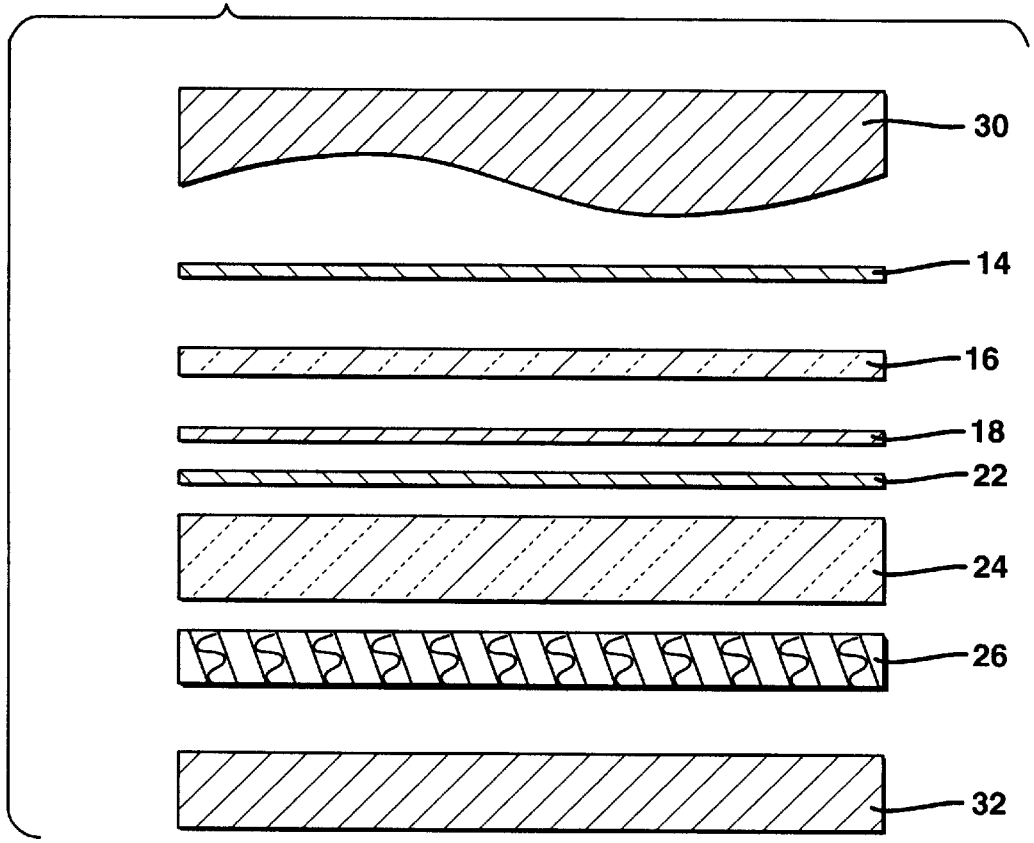
FIG. 3 is an exploded cross-sectional view of a preferred arrangement of materials for a preferred initial molding step wherein the mold halves are in open positions.

A panel 10 is preferably fabricated utilizing commercially available molding equipment and is preferably molded as described below and depicted in FIGS. 3–6. As can be seen in FIG. 3, the molding equipment is provided with a first mold half 30 that is configured to provide the panel 10 with the desired outer surface geometry. The mold also includes a second mold half 32. The mold equipment is designed to heat the mold halves (30, 32) and to clamp the desired composite of materials to be molded therebetween under various predetermined temperatures and amounts of pressure for various predetermined time periods.

Figure 4:
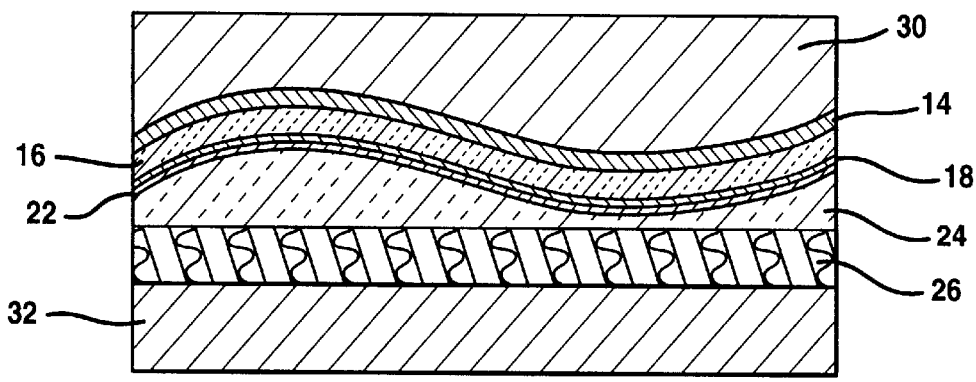
FIG. 4 is a cross-sectional view of the materials of FIG. 3, with the mold halves in closed positions.

To begin a preferred molding process, the mold halves (30, 32) are moved to their opened positions as shown in FIG. 3. Thereafter, the materials (14, 16, 18, 22, 24, 26) are inserted between the mold halves (30, 32) in the arrangement shown. After the layers of preferred materials (14, 16, 18, 22, 24, 26) are inserted between the mold halves (30, 32), the mold halves are moved to their closed positions as shown in FIG. 4. After the mold halves (30, 32) have been closed, they preferably heat the materials to approximately 400–450° F. (204–232° C.) under a preferred pressure of 10–30 psi for a preferred first dwell time period of 45–150 seconds.

Figure 5:
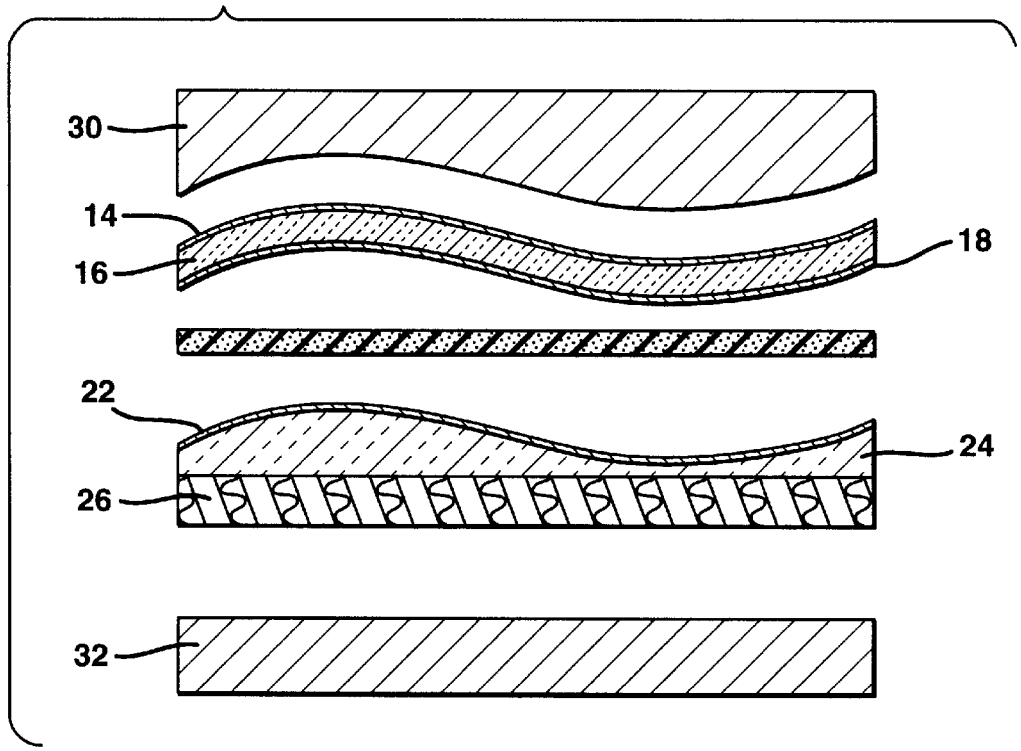
FIG. 5 is an exploded cross-sectional view of a preferred arrangement of materials after the initial molding step with the mold halves in open positions.
Figure 6:
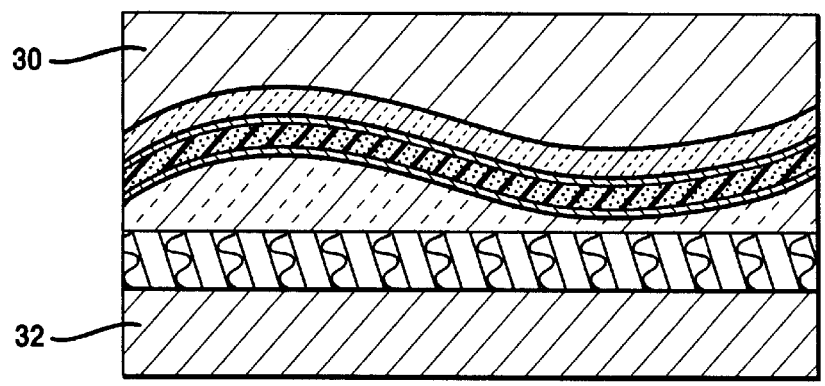
FIG. 6 is a cross-sectional view of the materials of FIG. 5 with the mold halves in closed positions.

During this initial molding operation, the binder material on the molding media 16, 24 cures causing the first foil layer 18 to adhere to the first molding media 16 and the second foil layer 22 to adhere to the second molding media 24. Because the confronting sides of the first and second foil layers (18, 22) are not provided with a binder material, the first molding media 16 can be separated from the second molding media 24 after the mold halves (30, 32) have been opened as shown in FIG. 5. After the mold halves (30, 32) have been opened, the layer of asphalt material 20 is inserted between the first molding media 16 and the second molding media 24. In preferred practice, the time required to open the mold halves (30, 32) and insert the asphalt layer 20 between the first and second molding medias (16, 24) takes approximately 10–20 seconds. During such time period, the mold halves (30, 32) cool to approximately 250° F. (121° C.) which enables the asphalt layer 20 to be molded when the mold halves (30, 32) are closed as shown in FIG. 6. Preferably, the mold halves (30, 32) are closed for a period of 10–20 seconds to apply a pressure of approximately 0–1 psi to the panel to the composite of materials. After such time period expires, the mold halves (30, 32) are opened and the molded panel 10 is removed. The skilled artisan will appreciate that the foil layers (18, 22) prevent the asphalt layer 20 from bleeding through into the layers (16, 24). Also, the use of such foil layers (18, 22) enhances the fire resistant attributes of the panel 10.

The panels 10 of the present invention solve many problems commonly associated with prior panels. In particular, the subject panel 10 is relatively lightweight and exhibits structural qualities that enable the panel 10 to be fabricated in relatively large sizes [e.g., 4 ft×8 ft (1.2×2.4 m) cross-section] which enable it to be used in a variety of different settings. In addition, the preformed backing 26 provides a uniform attachment surface for easy installation by, for example, commercially available adhesive or other mechanical fastening means such as screws, nails, etc. Also, the overall panel thickness can be economically varied by utilizing thicker or thinner preformed backing material 26.

Figure 7:
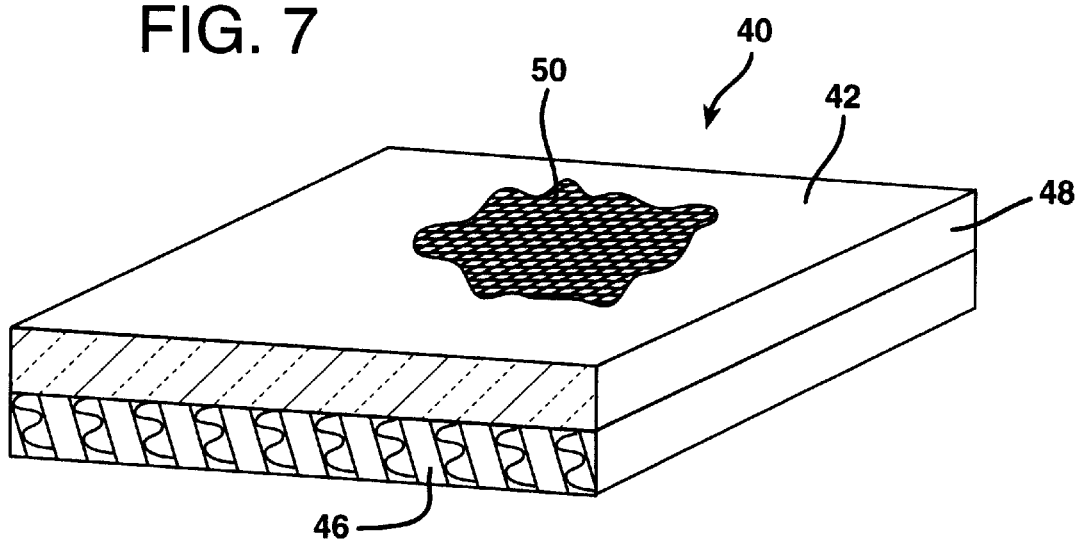
FIG. 7 is a partial perspective view of a preferred panel of the subject invention.

Another preferred embodiment of the present invention for acoustically tuning an enclosed space such as a room is shown in FIG. 7. As can be seen in that Figure, a preferred panel 40 has a first surface 42 that is acoustically absorptive and a second surface 44 that is acoustically reflective. As used herein, the term "acoustically reflective" means the ability of a material to reflect sound energy at a certain frequency. A material's degree of acoustical reflectivity is represented by its reflection coefficient, which is the ratio of the amount of reflected sound energy to the total incident sound energy striking the material. The term "acoustically absorptive" means a soft porous surface which absorbs sound energy. A material's degree of acoustical absorbtivity is represented by its sound absorption coefficient which is the ratio of sound energy absorbed by a material to the total incident sound energy striking the material. In a preferred embodiment, panel 40 comprises a rigid backing board 46 that has a fibrous material 48 laminated thereto. Preferably, the backing board 46 comprises commercially available gypsum wall board which can be installed utilizing commercially available adhesive and/or by mechanical fasteners, such as screws, nails, etc. We prefer to employ wall board having a thickness of ¼" (__ cm) which serves to provide a desirable amount of durability during handling and installation. It has been discovered that such wall board provides a basis weight of one pound per square foot which provides adequate acoustic reflectivity. However, other material of differing thicknesses and densities could also be employed.

In one preferred embodiment, the fibrous material 48 comprises fiberglass board having a density of at least 3 pounds per cubic foot. Exemplary board of this type is manufactured by Owens Corning as an acoustical board product (700 Series Board); however, other suitable material such as mineral wool and the like could be successfully employed. To facilitate the use of such light density fiberglass or mineral wool material, a commercially available glass mat 50 is preferably laminated to the outer surface of the fibrous material 48. In a preferred embodiment, a glass mat 50 with a nominal basis weight of approximately 25 pounds per one thousand square feet is employed to enable the panel 40 to be installed utilizing conventional drywall screws without the screw heads tearing loose. The skilled artisan will also appreciate that the mat 50 serves as a load distributor which serves to increase the compressive strength of the fibrous material substrate. If desired, depending upon the installation orientation of the panel 40, the finish provided by the glass mat 50 can serve as the final wall finish. It will be further appreciated, however, that the panel 40 can also be successfully employed without the glass mat 50.

The fibrous material 48 can be fabricated utilizing a variety of known methods. For example, the glass mat 50 could be directly applied to the fiberglass or mineral wool during the initial board production process. That "faced" board could then be applied to the rigid backing board 46 utilizing suitable commercially available adhesive.

Figure 8:
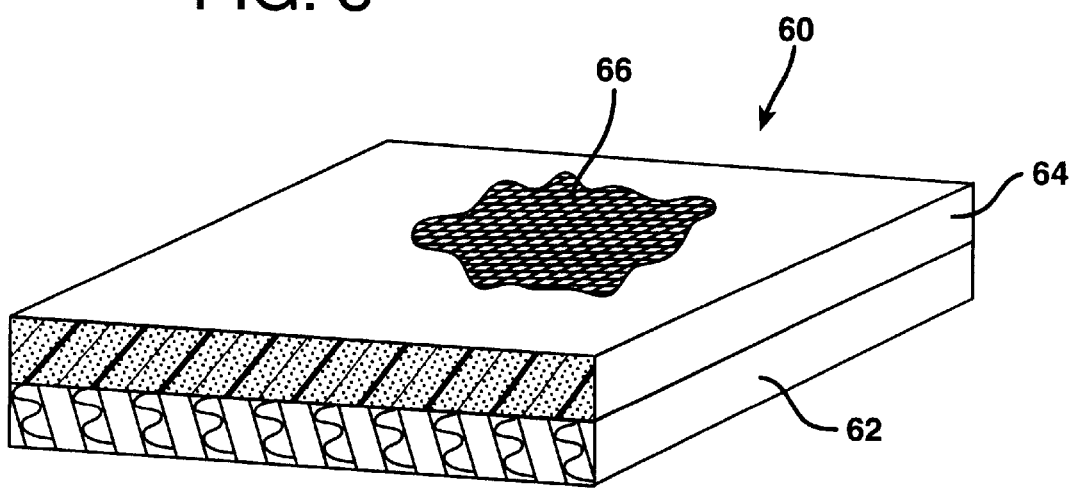
FIG. 8 is a partial perspective view of another preferred panel of the subject invention.

Another preferred embodiment of the present invention is depicted in FIG. 8. In this embodiment, the panel 60, preferably has a rigid backing board 62 of the type described above. Attached to the backing board 62 is a commercially available open-cell melamine foam 64, preferably of the type manufactured by BASF of Germany under the registered trademark BASOTECT. Preferably, this foam has a density of 0.7 pounds per cubic feet. As with the previously described preferred embodiment, a glass mat 66 is preferably laminated onto the foam 64. However, the panel 60 could be employed in the various manners discussed below without the use of the glass mat 66.

Figure 9:
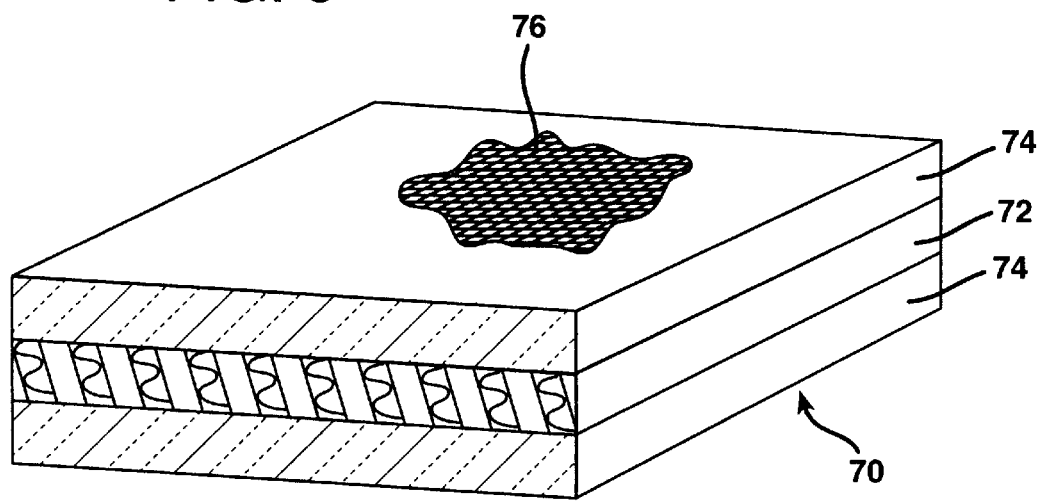
FIG. 9 is a partial perspective view of another preferred panel of the subject invention.

FIG. 9 depicts yet another preferred embodiment of the present invention. In this embodiment, the panel 70 preferably has a rigid backing board 72 of the type described above. Attached to each side of the backing board 72 are fibrous materials 74, preferably of the type manufactured by Owens Corning as an acoustical board. As with the previously described preferred embodiments, a glass mat 76 is preferably laminated onto the fibrous material 74 that will face the interior of the room. However, the panel 70 could be employed in the various manners discussed below without the use of the glass mat 76.

Figure 10:
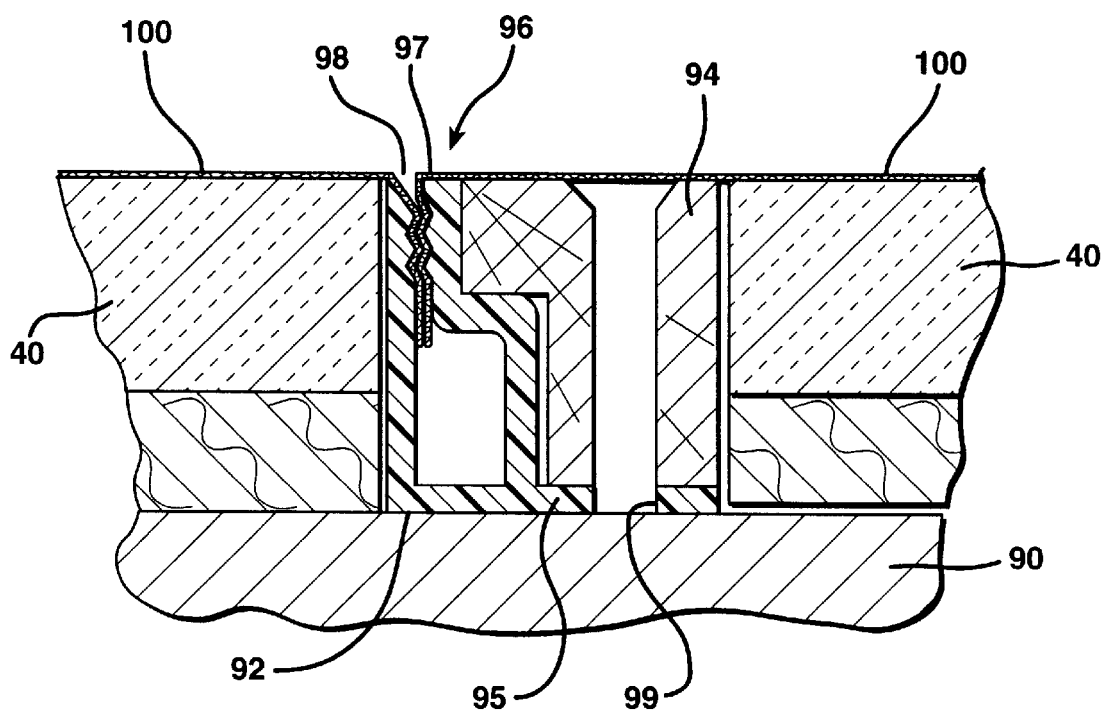
FIG. 10 is a cross-sectional assembly view of a preferred fabric retainer member of the present invention and preferred panels of the present invention attached to an existing wall.
Figure 11:
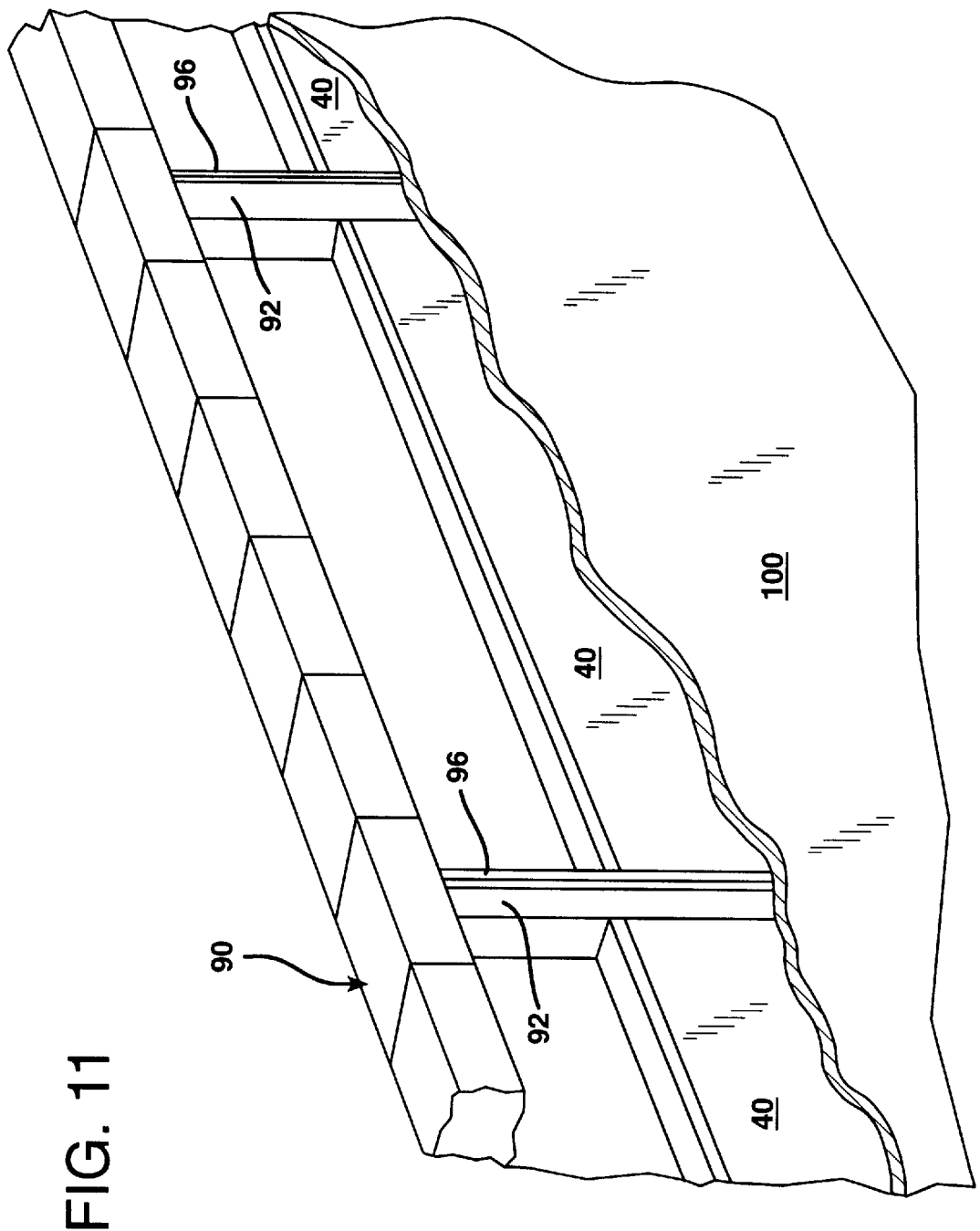
FIG. 11 is a partial perspective view of the preferred fabric retainer members and panels of FIG. 10 attached to the wall of FIG. 10.

FIGS. 10 and 11 depict a preferred method for installing panels (40, 60) adjacent an existing wall 90. The reader will appreciate that the same method could also be employed to install panels 70. In a preferred embodiment, fabric retainer members 92 are employed. As shown in FIG. 10, a preferred fabric retainer 92 comprises an elongated rectangular-shaped support member 94 that can be fabricated from a myriad of different materials such as wood, plastic, etc. Attached to the support member 94, preferably by stapling or gluing, is a moldable strip 95 of the type disclosed in U.S. Pat. No. 5,117,598 to Livingston, the disclosure of which is herein incorporated by reference. While the fabric retainer 92 depicted in FIG. 10, is of two-piece construction, the skilled artisan will appreciate that such member could be extruded as a single unitary piece utilizing known extrusion techniques. The skilled artisan will also appreciate that such retainer 92 could be provided in the form of a "T" or be shaped to accommodate inside and outside corners. In addition, other of methods for supporting a fabric sheet or similar material on a surface could also be successfully employed.

In a preferred embodiment, to facilitate attachment of the fabric retainer 92 to the wall 90 in a desired manner, the support member 94 is provided with a plurality of countersunk bores 99 for receiving attachment screws (not shown) therethrough. However, other methods of attaching the fabric retainer member 92 to the support wall 90 may also be employed. The retainer member 92 is formed with a fabric gripping portion 96 that comprises two confronting members (97, 98) that are arranged to permit a piece of fabric material 100 or other acoustically transparent medium to be inserted therebetween.

As can be seen in FIG. 11, the fabric retainer members are attached to the support wall 90 at spaced intervals that enable a series of like-constructed preferred panels (i.e., panels 10, 40, 60 and/or 70) to be installed therebetween. The panels are attached to the support wall 90 by adhesive or mechanical fasteners such as screws, nails, etc. For all of the panels disclosed herein, the preferred method of attachment is by coarse thread screws into a drywall support wall 90, such that the panels are acoustically decoupled from the underlying wall studs. After the panels have been attached between the fabric retainers 92, the fabric 100 is then stretched over the panels and attached to the retainers 92 such that the fabric 100 covers the panels and retainers 92. While the foregoing installation method was directed to wall coverings, the skilled artisan will appreciate that such method may be successfully used on a variety of different surfaces such as ceilings, doors, floors, etc.

Figure 12:
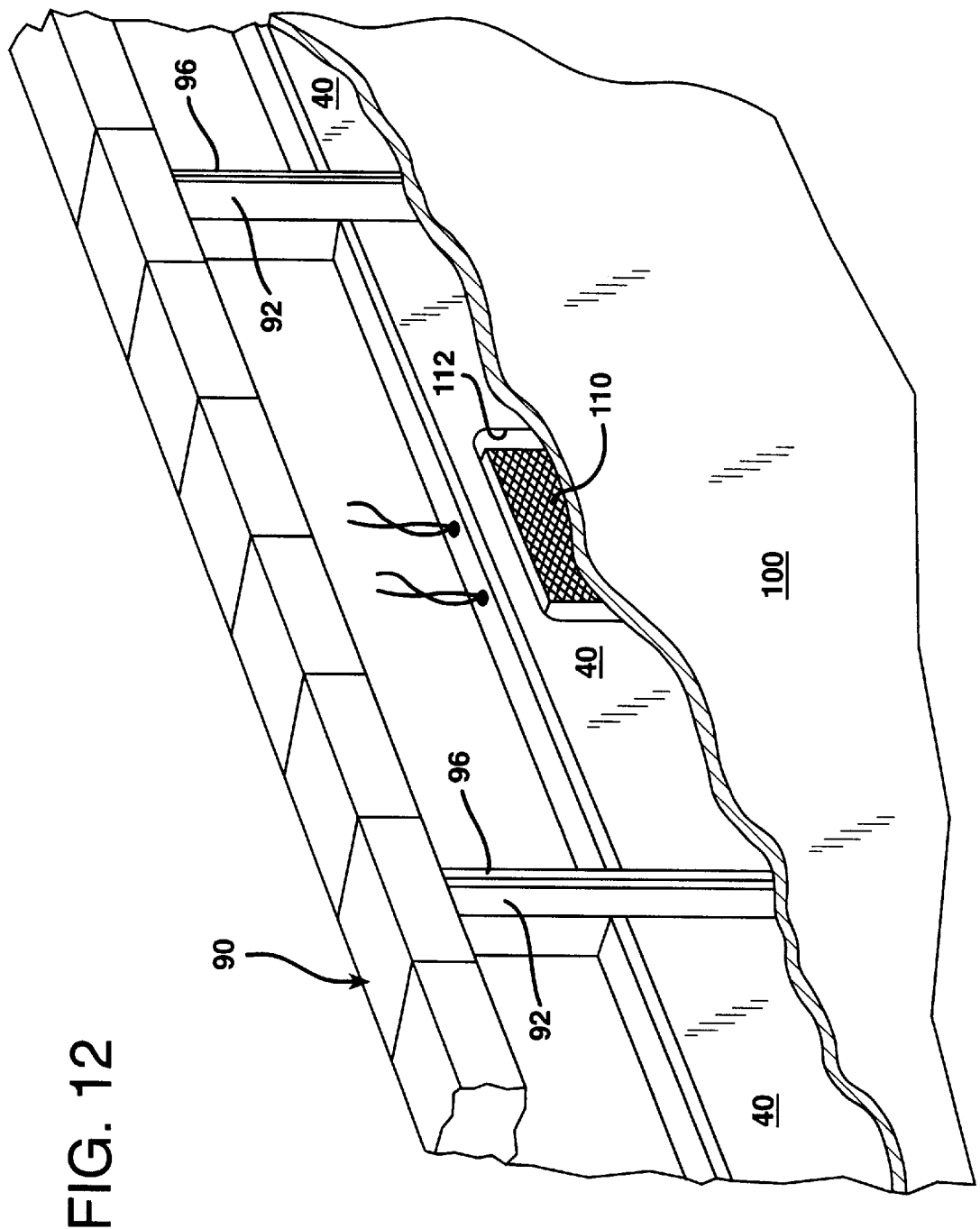
FIG. 12 is a partial perspective view of preferred fabric retainer members of the present invention and preferred panels of the present invention attached to an existing wall and wherein a speaker component is received within a cavity in one of the panels.

The reader will further appreciate that the forgoing installation method is well-adapted for concealing wall or ceiling mounted components such as speakers, etc. For example, as shown in FIG. 12, when it is desirable to conceal a wall mounted speaker 110, a receiving cavity 112 is cut into a corresponding panel member 40. In this embodiment, the panel 40 is preferably at least as thick as the speaker, such that when the speaker is mounted (utilizing known attachment methods) within the cavity 112, preferably none of the speaker 110 protrudes therefrom. See FIG. 12. Also, by providing the backing board 46 with a flat black color, the panel can function as a screen for projection devices by mounting the black side so that it faces the projection device. The skilled artisan will also appreciate that the diffuser panels 10 described above may also be employed to provide a desired amount of acoustical diffusion within a room. The diffuser panels 10 would be installed in the same manner as the panels 40 or 70.

Figure 13:
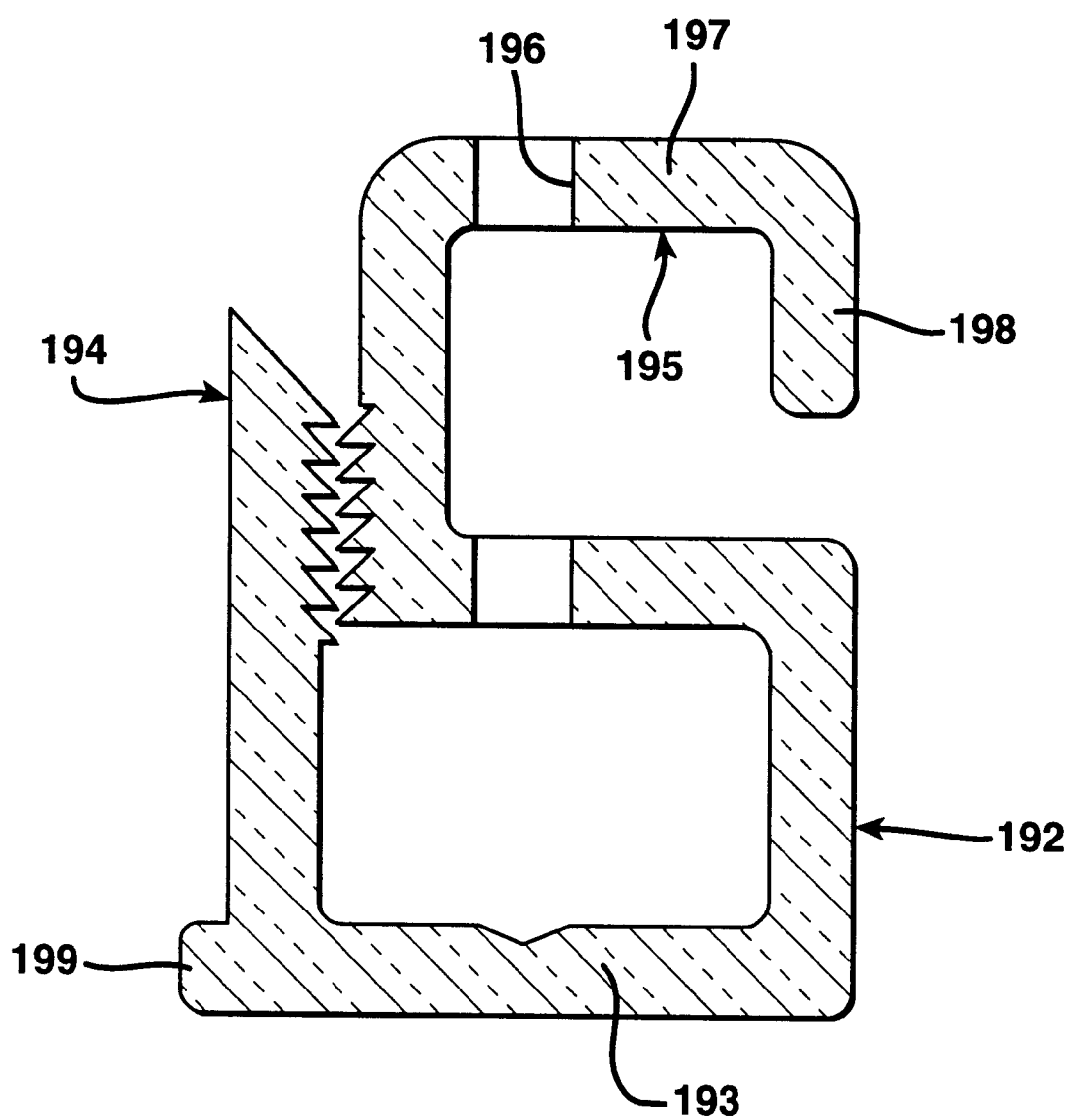
FIG. 13 is a cross-sectional view of a more preferred fabric retainer member of the present invention.

FIG. 13 is a cross-sectional view of a more preferred embodiment of the fabric retainer of the present invention. The fabric retainer 192 would normally be formed as an elongated channel having the cross-section shown, and includes a base 193 that would normally be fastened against a wall or other supporting structure, a retaining portion 194 for grasping and retaining fabric, and an extension arm 195. The extension arm 195 includes a plurality of holes 196 (only one shown) therethrough to allow a screw or other fastening device to be driven through the base 193. The extension arm further includes an upper locating arm 197 and a side locating arm 198. The upper locating arm 197 is designed to have an outer surface coextensive with the outer surfaces of adjacent panels, such that the fabric held by the retainer 192 extends across the panels and the upper locating arm 197 in a smooth, aesthetic manner. The side locating arm 198 enables the retainer 192 to be positively located against an adjacent panel 40 even when the backing board 46 faces outwardly and is thus spaced from a supporting wall and the base 193 of the retainer. An extension 199 of the base 193 enables the retaining portion 194 to be spaced from an adjacent surface (such as an adjoining wall in a corner of a room) by a small amount, enabling insertion of fabric into the retaining portion 194 to be accomplished more easily.

Those of ordinary skill in the art will also appreciate that the panels (40, 60, 70) can be used to advantageously acoustically tune an enclosed space such as a room. That is, the preferred design parameters of the panels (40, 60, 70) provide a flexible and relatively inexpensive means for controlling the sound absorption characteristics occurring within a room or enclosed space. Properly balanced sound absorption, in e.g., a home theater environment, can dramatically decrease sound image localization. The material properties of these panels and their orientation to the source of the sound determine the amount of sound absorption occurring relative to the desired frequency range of the sound to be attenuated. For example, a human's experience of sound is often analyzed in terms of a low range of frequencies, i.e., less than 300 Hz, a mid-range of frequencies, i.e., 500 to 4000 Hz, and a high range of frequencies, i.e., 4000 to 20,000 Hz, with the mid-range of frequencies generally being considered most important for applications such as home theater. In the case of low range frequency absorption (less than 300 hertz), an absorption coefficient of 0.20 or greater is desired, especially in a room to be used as a home theater, and can be approximated by having the backing board exposed to the sound source(s). Those panels that are installed with their fibrous material facing the sound source(s) have sound absorption coefficients between about 0.65 and 0.90 for mid-range frequencies (frequencies ranging from 1000–4000 hertz). For mid-range frequencies, sound absorption coefficients above 0.75, for example in a room to be used as a home theater, are desirable and are approximated well when the preferred panels of the subject invention are used.

Further, reflection coefficients of 0.90 and above are expected for many low-range frequencies when the panels' fibrous material is exposed to the sound source, and are expected for most mid-range frequencies with the backing board so exposed. These properties allow sound reflection characteristics in a room to be designed to provide such acoustical characteristics as sound presence, or sense of spaciousness, and definition or clarity of the sound stage.

Figure 14:
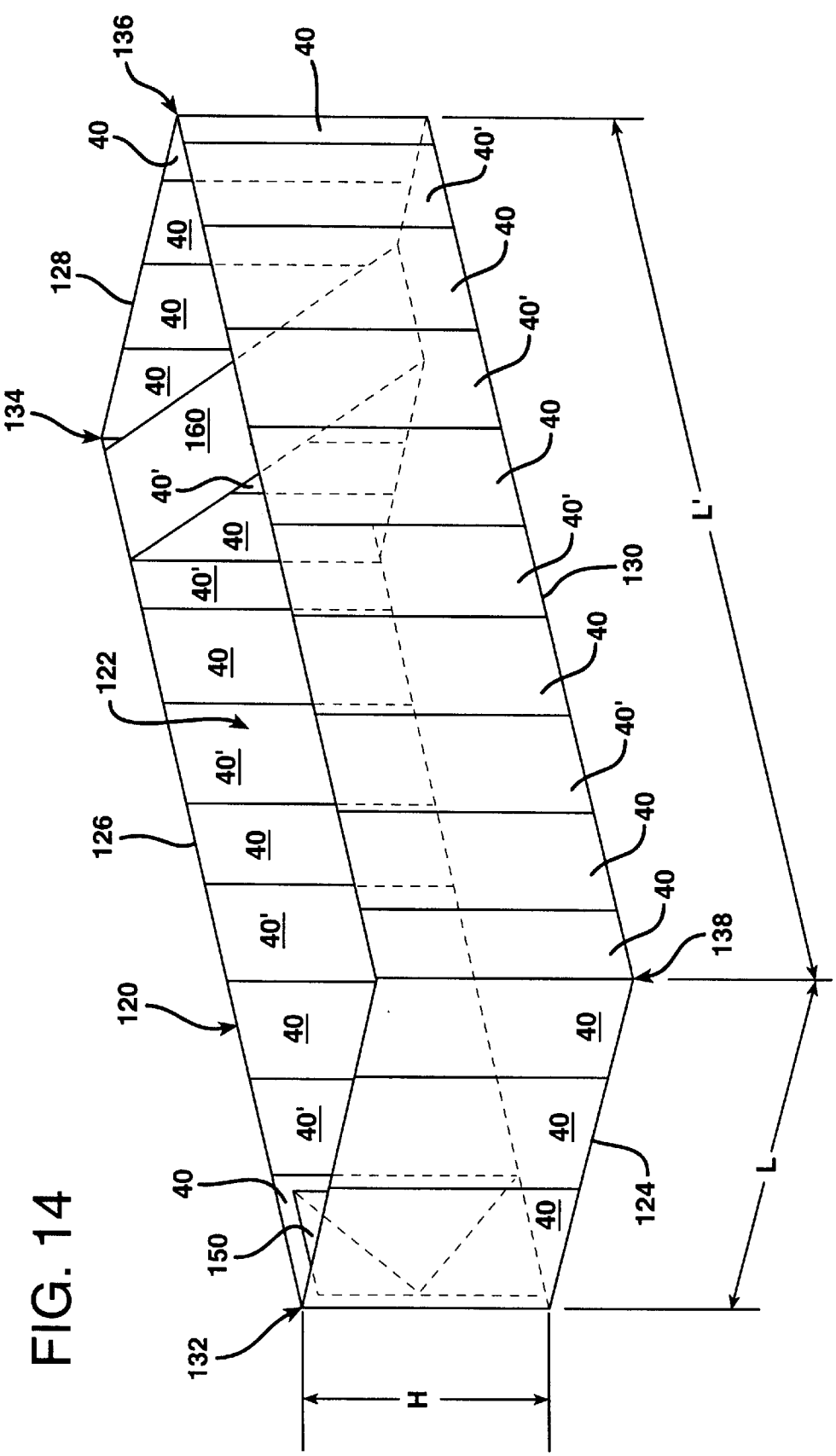
FIG. 14 is a schematic perspective view of an enclosed area that has preferred panels installed therein in a preferred arrangement of the present invention.

FIG. 14 depicts an enclosed space 120 that has an interior 122 that is subjected to a source of sound (not shown). The enclosed space 120 also has four walls (124, 126, 128, 130). As can be seen in FIG. 14, wall 124 opposes wall 128 and wall 126 opposes wall 130. In this example, the enclosed space 120 also has four corners (132, 134, 136, 138), a door 150 and a stairway 160. Those of ordinary skill in the art will also appreciate that the preferred installation arrangement of the present invention can be installed in a variety of differently shaped rooms without departing from the spirit and scope of the present invention.

As is evident from the test results shown below, it has been discovered that an enclosed space can be acoustically tuned (i.e., to provide studio-like performance) by advantageously mounting panels at each corner with their acoustically absorptive side facing the interior of the space and then alternately mounting panels along the walls such that every other panel is mounted with its acoustically absorptive side facing the interior space and such that panels on opposing walls are mounted in opposite orientations. Those panels that are installed with their acoustically absorbent side facing the interior 122 of the enclosed space 120 are designated as 40 and those panels that are installed with their acoustically reflective side facing the interior 122 of the encloses space 120 are designated as 40'.

The walls (124, 126, 128, 130) each have a height "H". In the example shown in FIG. 14, the end walls (124, 128) have a length "L" that is shorter than the lengths "L'" of walls (126, 130). In such room configuration, panels 40 are preferably installed at each corner (132, 134, 136, 138) and on each end wall (124, 126). It will be appreciated, however, that the panels attached to the end walls (124, 128) could also be arranged in an alternating fashion as described below. The walls (126, 130) are covered with alternating panels (40, 40') such that panels on an opposing wall have a different orientation. For example, except in the corners, a panel 40 on wall 126 will have a panel 40' directly opposite it on wall 130. See FIG. 14.

The enclosed space 120 depicted in FIG. 14 includes a stairway 160. Preferably, the panels (40, 40') are installed such that they alternate along the exposed side of the stairway as shown in that Figure. Also, the skilled artisan will readily appreciate that the panels (40, 40') of the present invention can be attached to the existing door 150 and window structures (not shown). In the alternative, the door 140 may be constructed utilizing framing material and the panels of the subject invention. Conventional door attachment hinges, slides, etc. could also be used.

It should be understood that, while the panels 40, 60, 70 are generally shown as being large panels, such as 4 ft by 8 ft (__ m by __ m) panels, in a more preferred embodiment of the invention the panels may be different, smaller sizes. Such smaller sizes, such as 4 ft by 4 ft (__ m by __ m) panels or even 2 ft by 4 ft (__ m by __ m) panels, can have the advantage that they can enable a room to be more precisely tuned, or to handle rooms where a uniform treatment from floor to ceiling along a particular portion of a wall proves to be acoustically undesirable. For example, in such a case an acoustically absorptive panel may be located along a lower portion of the wall and an acoustically reflective panel may be located along an upper portion of the wall, or vice versa. Such smaller sizes do have the disadvantage, however, that they generally increase the time required to install an acoustical treatment system in a given room, because more panels need to be fastened to a support wall. Accordingly, a standard panel size of less than 4 ft by 4 ft (__ m by __ m) is generally not preferred at this time. It of course should be understood that in the normal course of installation an installer may have to cut standard panels to fit into particular portions of particular rooms, and such cutting of panels to smaller sizes during installation is considered to be a normal part of installation.

It should further be understood that, while FIG. 14 illustrates an enclosed space 120 as having acoustical panels 40, 40' installed on all four walls 124, 126, 128, 130 of the space, this arrangement is only a most preferred embodiment of the invention. It is fully contemplated by this disclosure that a preferred embodiment of the present invention may include only panels 40, 40' on a wall in or to which various stereo or home theater components are mounted or adjacent, such as wall 124, or may include only panels installed in the corners of the space 120. Further, a more preferred embodiment of the invention may include panels 40, 40' installed only on two adjacent walls, such as walls 124, 130, or on two opposing walls, such as walls 126, 130. In such preferred and more preferred embodiments, various advantages of the present invention may be still be achieved.

It is contemplated herein that the fabric retainers of the present invention may be spaced between each panel, to stretch and retain standard width pieces of fabric across each individual panel. In a preferred embodiment of the present invention, however, a sewn-seam stretch fabric, as is known in the art, may be utilized to cover large portions or all of each wall 124, 126, 128, 130. In such a case, the fabric retainers would need only to be placed around the edges of a wall, and around any objects over which the fabric would not extend, such as doors, windows, television screens, etc., and the sewn-seam fabric could be stretched to cover the rest of the wall. The advantage of this type of installation is that it would require less length of fabric retainer and thus would be less expensive, and also that it could form an unbroken, more acoustically pleasing wall surface. In addition, such an installation would allow the smaller size panels referenced above to be used, and thus a more precisely-tuned space to be achieved, without detracting from the aesthetics of the installation with numerous, irregularly-sized fabric squares.

While the use of sewn-seam fabric in an installation is currently preferred, it should be understood that its use over an entire wall is disclosed herein only to satisfy any potential best mode requirements. The concept is the invention of an inventive entity different from the inventive entity of the instant application, and was disclosed to the instant inventive entity by the other inventive entity. The instant inventive entity claims no rights in the concept, other than those rights available to the general public.

Figure 15:
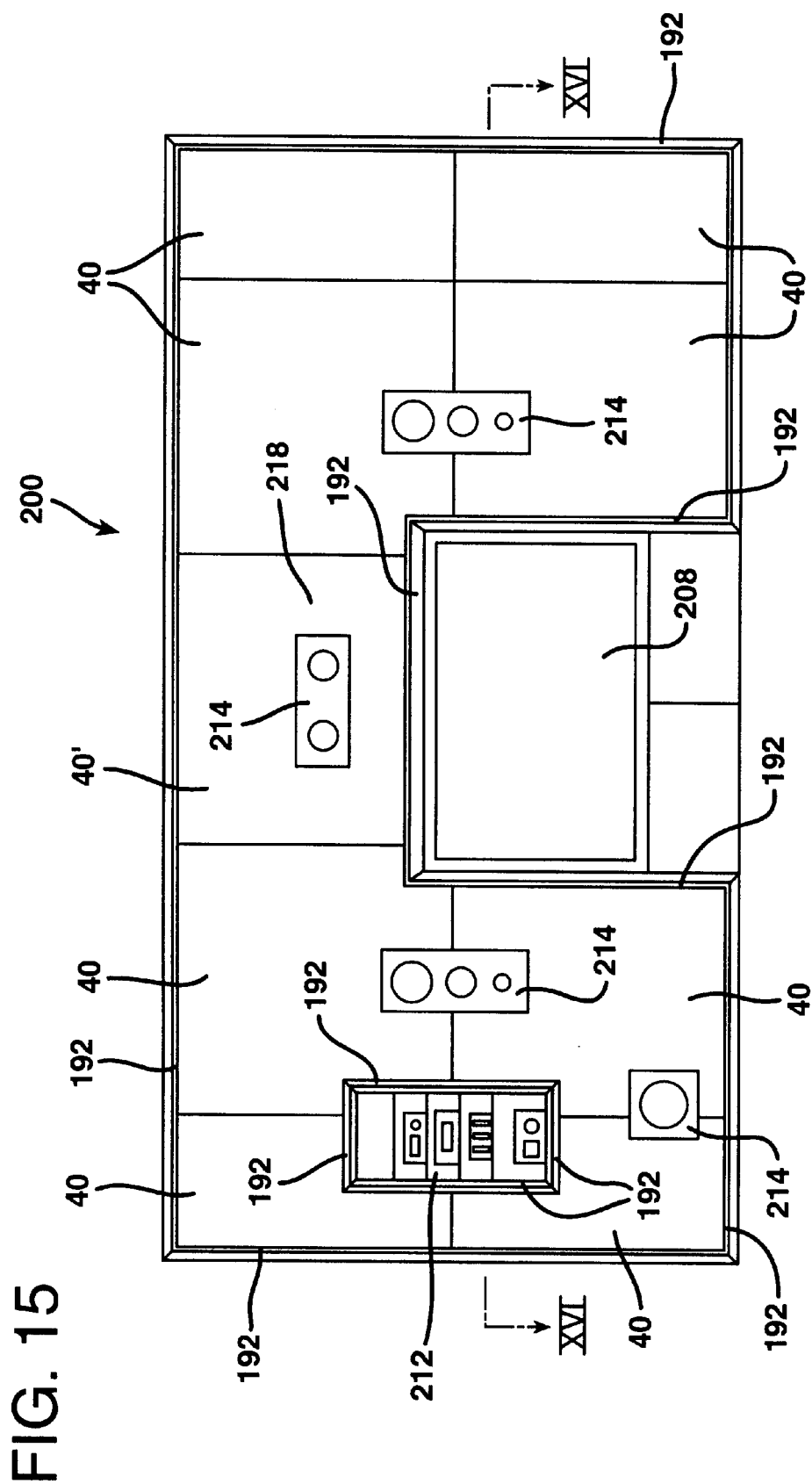
FIG. 15 is a plan view of an acoustical built-in wall system of the present invention, with a fabric thereof removed.
Figure 16:
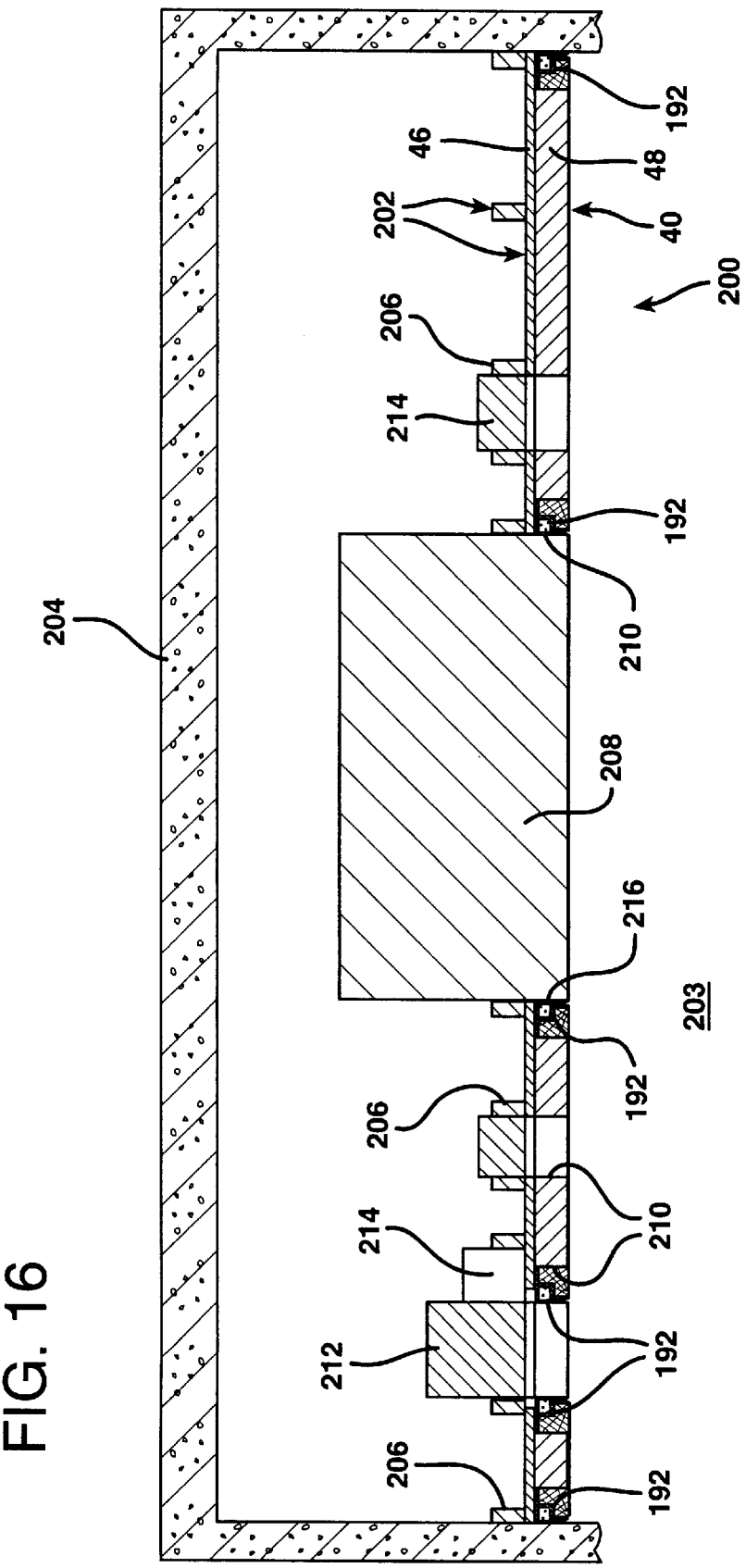
FIG. 16 is a cross-sectional view along line XVI—XVI of FIG. 15, with the fabric in place.

FIGS. 15 and 16 illustrate a first embodiment 200 of an acoustical built-in wall system of the present invention, with a fabric thereof removed. More specifically, the built-in wall system 200 includes a supporting wall structure such as a partition wall 202 constructed across one end of an existing enclosed space or room 203, such as defined by masonry wall 204 of FIG. 16, into which are mounted various audio and/or video components of, for example, a standard home theater system. The wall 202 is preferably formed of wood studs 206, although steel studs or any other non-load bearing wall construction technique may be used, to which are attached various panels 40, 40' (or 10, 60 or 70) arranged to provide a desired acoustical treatment system. For example, FIG. 15 shows an acoustically reflective panel 40' mounted in the center of the system 200 above a big screen television 208 to enliven what could otherwise be a dead response area of the system 200, and acoustically absorptive panels 40 mounted towards the sides of the system 200 to reduce sound image localization generated in part by interference patterns in corner areas of space 203. It should be understood that although the panel 40' is referred to as acoustically reflective, the desired acoustical effect in a particular area of the system 200 may include diffusion, i.e., controlled reflection of sound, thus the acoustically reflective panel 40' could be a diffuser panel such as the panel 10 so that the panel would be acoustically reflective in a controlled manner or to form a desired reflection pattern.

Cutouts 210 are formed in the panels 40, 40' upon installation to allow for items such as an audio and video component rack 212 to be visibly exposed and accesible, or to allow the speakers 214 to be acoustically exposed to the enclosed space 203. As shown, the audio and video component rack 212 and the speakers 214 may be mounted directly to the wood studs 206 to suspend them in appropriate locations in the system 200. The television 208 is preferably slid into an opening 216 in the system 200 designed for it, so that the opening 216 may act also as entryway to the rear of the system 200 when service or maintenance of the various components are required.

Fabric retainers 192 are located along and frame the top, bottom, and side edges of the system 200, and also frame out any components, such as the television 208 and the component rack 212, that must be visible or accessible from the enclosed space 203. The fabric retainers 192 would normally stretch and retain a fabric across the area 218 surrounded by the retainers 192. Notably, this area 218 would include areas covering the cutouts 210 that acoustically expose the speakers 214. This is possible as long as the fabric is generally acoustically transparent. The net effect is thus that a very simple, aesthetically pleasing wall surface is presented, visibly broken only in one or two areas, to visibly expose the television 208 and the component rack 212. Many elements of a standard home theater system, such as the speakers, wiring and most surfaces of the remaining components, can thus be bidden by the built-in wall system 200, to present a very professional, aesthetic installation.

It is contemplated that the built-in wall system 200 can be used alone without any further acoustical treatment systems in the space 203, and the acoustical and aesthetic characteristics of the space 203 can be advantageously effected. However, more preferably, additional treatment systems may be applied to adjacent exposed walls of the space 203, or even more preferably to all of the exposed walls of the space 203, and further advantageous effect may be had upon the acoustical and aesthetic characteristics of the space. It is also contemplated that acoustical wall treatments could be applied to the existing walls of space 203 behind the system 200, such as highly acoustically absorptive panels. It is further contemplated that, given the existing dimensions of a space 203 and a preferred seating location, that existing calculations known in the art could be used to optimize the location of the system 200 in the space, and thus the acoustics in the area of the preferred seating location.

Figure 17:
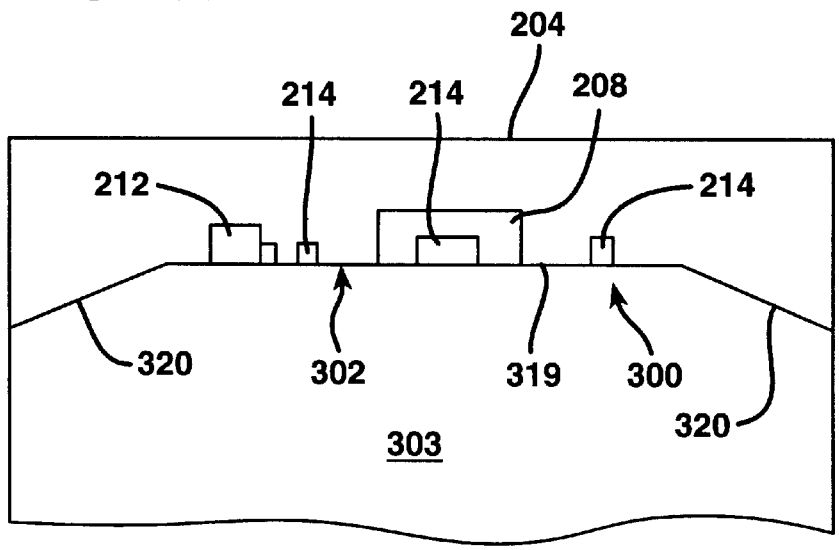
FIG. 17 is a schematic top view of a second embodiment of an acoustical built-in wall system of the present invention.

FIG. 17 is a schematic top view of a second embodiment 300 of an acoustical built-in wall system of the present invention. In the embodiment of system 300, the partition wall 302 includes on either end thereof a wall portion 320 that is acutely angled with respect to a main portion 319 of the wall 302. Accordingly, the acoustical panels mounted on the wall portions 320 are acutely angled with respect to the acoustical panels mounted on the main portion 319 of the wall 302. This system 300 may be useful in spaces 303 in which no further acoustical wall treatment systems will be installed, such that the wall portions 320 eliminate two 90 degree corners of the space 303. Ninety degree corners having one or more untreated wall surfaces have been found to be particularly prone to distort sound image localizations due to interference patterns produced by sound wave reflections.

Figure 18:
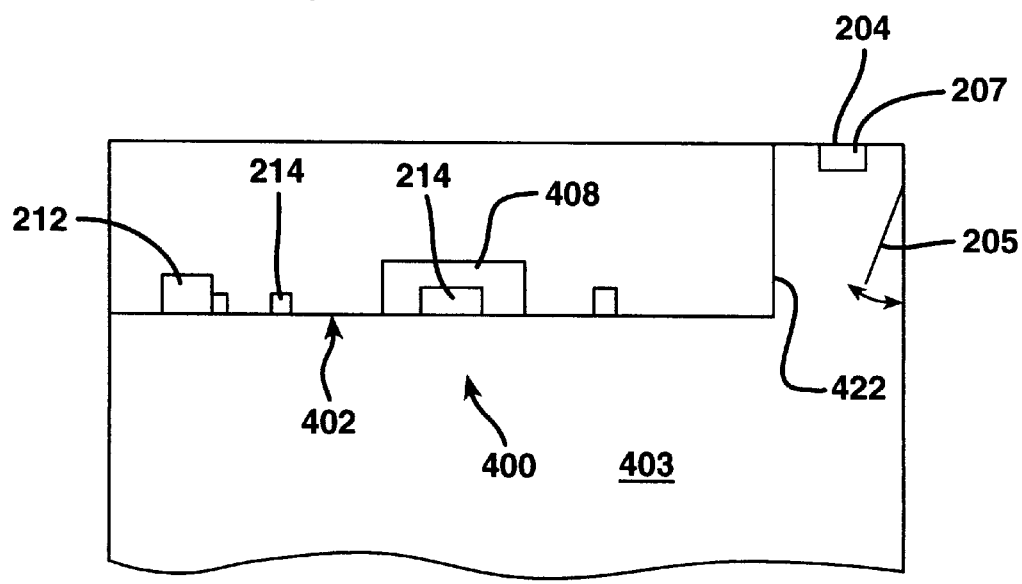
FIG. 18 is a schematic top view of a third embodiment of an acoustical built-in wall system of the present invention.

FIG. 18 is a schematic top view of a third embodiment 400 of an acoustical built-in wall system of the present invention. In system 400, the partition wall 402 does not extend completely across an end of the enclosed space 403. Instead, the wall 402 terminates short of the existing wall, such as masonry wall 204, and an end wall 422 extends behind the partition wall 402 to the end of the existing wall. The system 400 can thus be used where there is an object such as a door 205 or an electrical panel 207 that must normally be readily accessible in day-to-day or emergency situations. In addition, if desired the end wall 422 may be formed as a movable or at least partially removable wall, such as by mounting the wall 422 on hinges or by fastening acoustical panels thereof to the wall 422 by some easily removable means, such as bolts or Velcro(tm). It can be advantageous for the wall 422 to be removable especially if a television 408 to be used with the system 400 is not a standalone model, such that it must be mounted to the partition wall 402 off of the floor.

Figure 19:
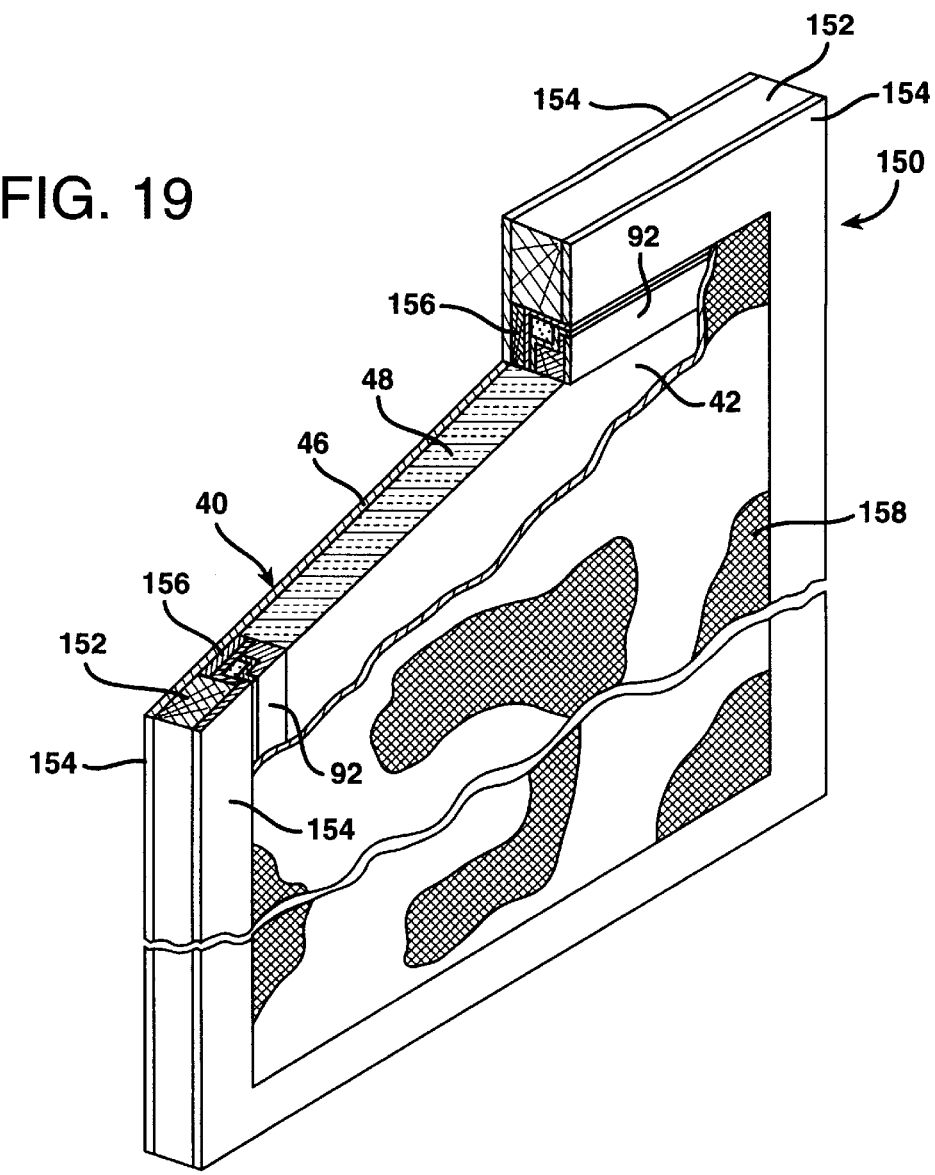
FIG. 19 is a partial perspective view of a preferred door construction of the present invention with a portion thereof cut away.
Figure 20:
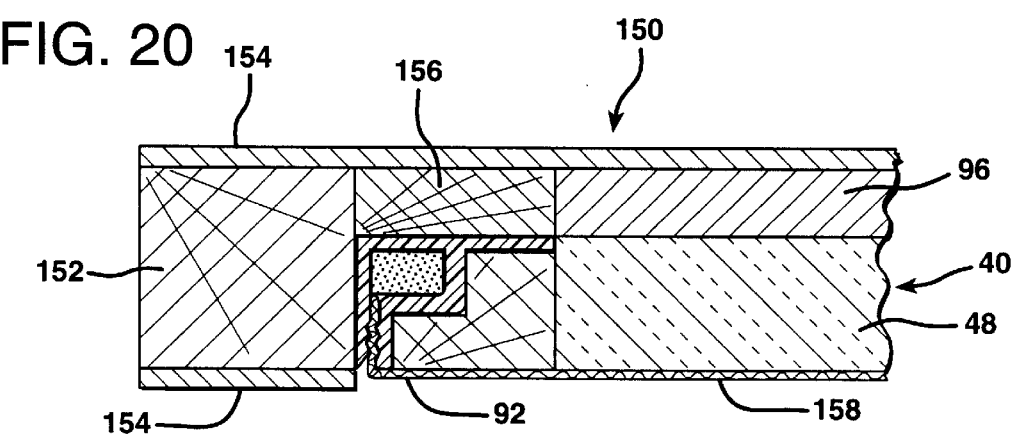
FIG. 20 is a partial cross-sectional view of the preferred door of FIG. 19.

As can be seen in FIGS. 19 and 20, the method and apparatus of the present invention is well-suited for retrofitting existing hollow doors. More specifically, many hollow interior doors comprise a frame member 152 that extends around the perimeter of the door 150. Attached to each side of the frame 152 are skin members 154. To incorporate the present method and apparatus into such a door to further enhance the acoustic characteristics of the enclosed space, one of the skins 154 is cut away along the inside perimeter of the frame 152. After one of the skins 154 is removed, a filler strip 156, preferably a common filler strip, is preferably attached to the inside of the frame 152 as shown. In a preferred embodiment, filler strip 156 is preferably attached to the inner surface of the skin 154 by a commercially available adhesive.

After the filler strip 156 has been installed, sections of fabric retainer 92 are attached around the inner perimeter of the frame 152. In a preferred embodiment, retainer 92 is attached to corresponding filler strips 156 by screws (not shown). After the fabric retainer 92 has been attached around the inner perimeter of the door frame 152, a panel (or panels) 40 is installed as shown in FIGS. 19 and 20. Preferably, the backing board 46 of the panel is attached to the intact skin 154 by commercially available adhesive. In a preferred embodiment, the acoustically absorptive surface 42 of the panel is arranged to face the interior of the room. Those of ordinary skill in the art will appreciate that other panels of the present invention may also be employed in the door 150 to provide a desired acoustical effect. After the panel(s) 40 have been installed, an acoustically transparent material, preferably fabric 158, is used to cover the panel(s) 40 and is attached to the fabric retainers 92 in the manner described above.

As is readily apparent from the foregoing description, the method and apparatus is well-suited for use with existing hollow doors or access panels for a room. However, the method and apparatus may also be advantageously used to fabricate new doors and access panels.

As evidenced by the test results in the following tables, the above-mentioned preferred method of installation provides a broad spectrum of acoustic absorption. The panels 40 that are arranged with their fibrous material facing the source of the sound effectively absorb higher frequency sound, while the panels with their backing boards facing the sound source absorb the lower frequency sounds. Thus, resulting in an arrangement which provides a broad range of absorption characteristics.

Figure 21:
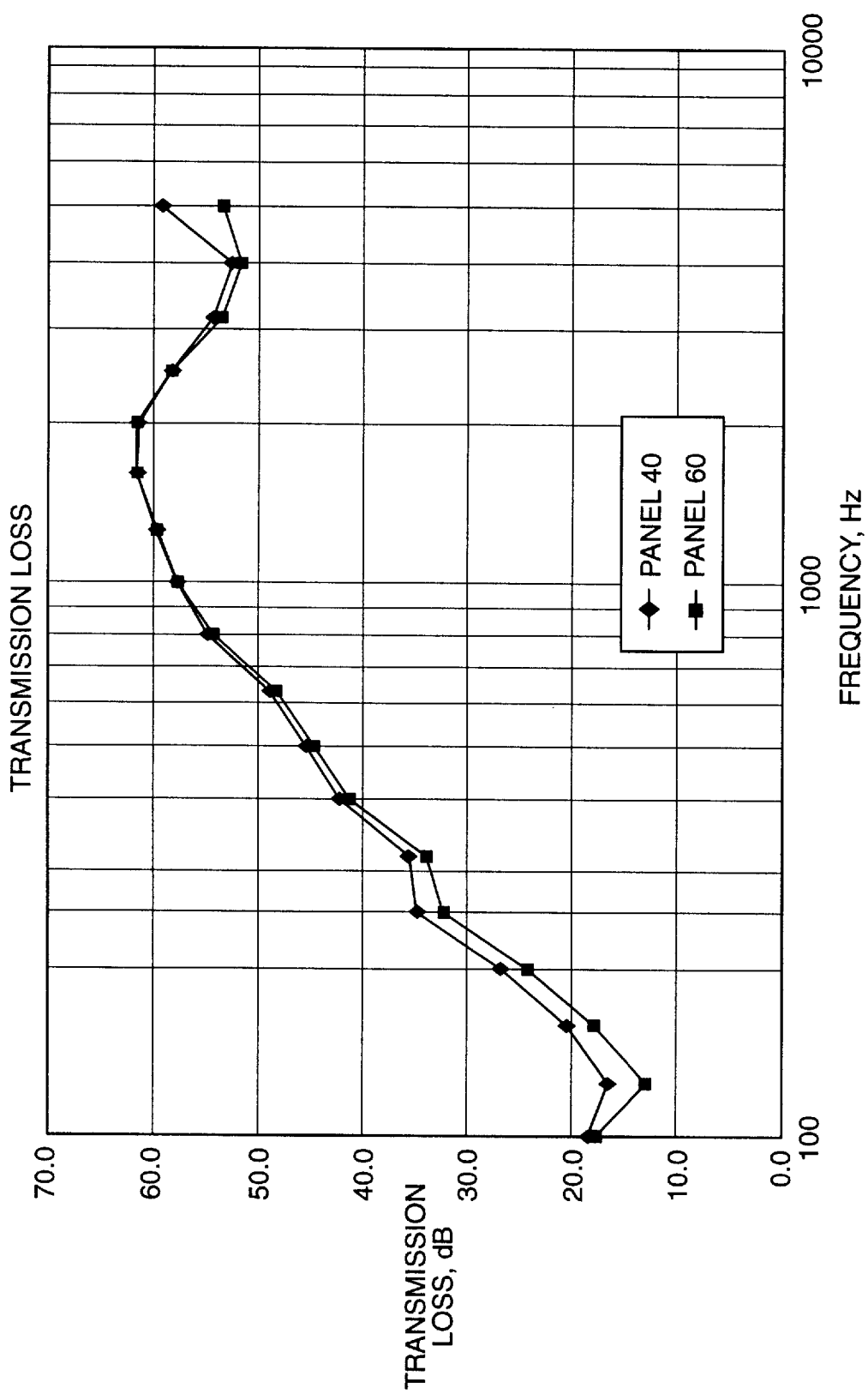
FIG. 21 is a graphical comparison of transmission loss in dB vs. frequency in Hz for two preferred panels of the subject invention.
Figure 22:
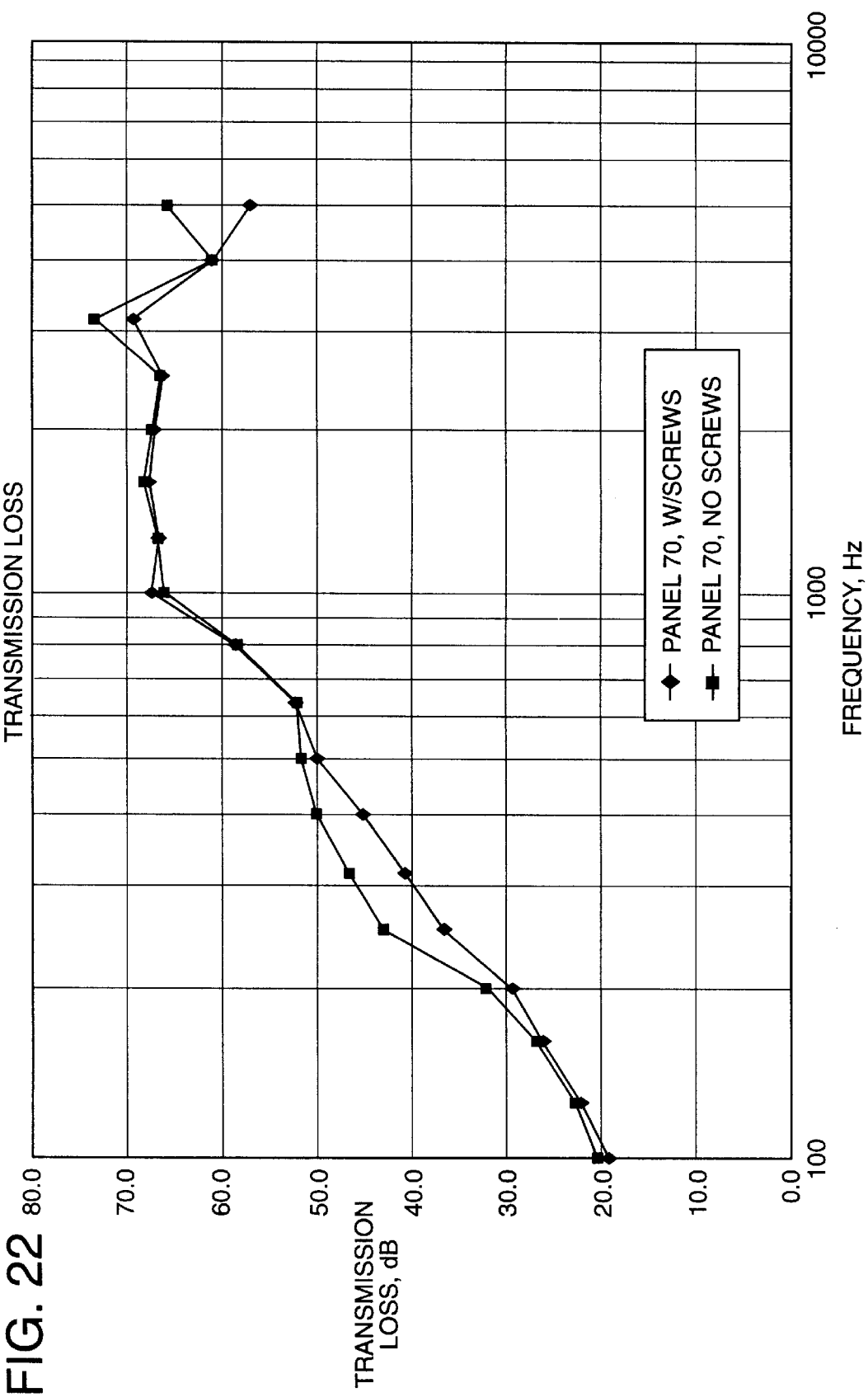
FIG. 22 is a graphical comparison of transmission loss in dB vs. frequency in Hz for a preferred panel of the subject invention attached to a support surface by screws and the same panel attached to the support surface without screws.
Figure 23:
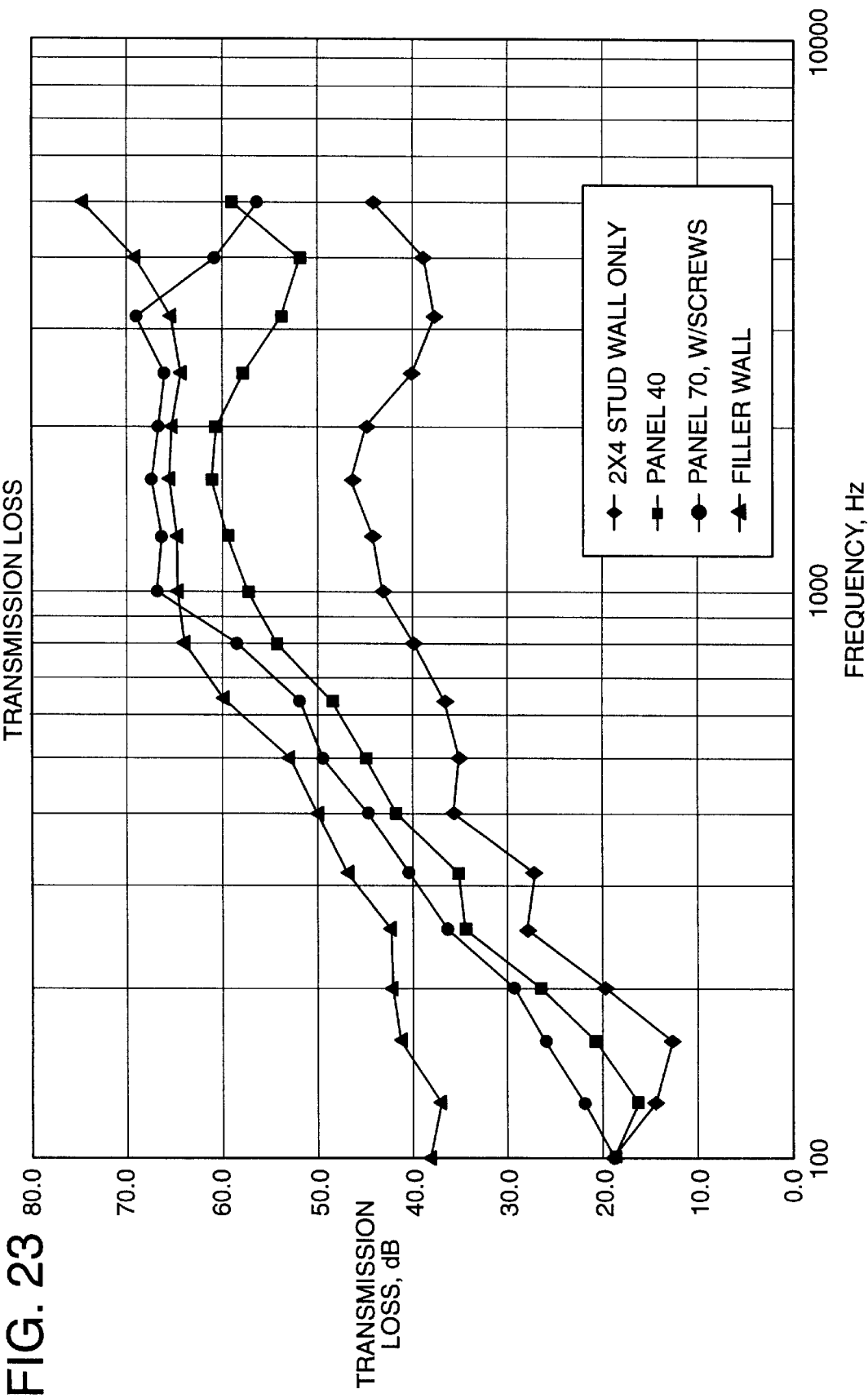
FIG. 23 is a graphical comparison of transmission loss in dB vs. frequency in Hz for a 2×4 stud wall, a preferred panel of the subject invention, another preferred panel of the subject invention attached to a support surface with screws and a filler wall.

FIG. 21 is a chart that compares the transmission loss, a measure of acoustical absorption, of a panel 40 to the transmission loss of a panel 60. The results depicted in FIG. 21, were obtained by approved test methods in a certified acoustical test laboratory. As can be seen from FIG. 21, the transmission loss for panels (40, 60) are relatively similar. FIG. 22, is a chart that compares the transmission loss of a panel 70 that is attached to a structure wall or ceiling with screws to the transmission loss that is experienced when the panel 70 is attached to a wall or ceiling structure utilizing adhesive. FIG. 23 is a chart that compares the transmission losses of various wall components, including panels (40, 70).

To further evidence the random incidence sound absorption of a panel 40 with the fibrous material 48 facing the source of the sound, a test was performed in an empty room having an area of seventy-two square feet (6.689 square meters). The room was empty and had a temperature of 22.5° C. and a relative humidity of 50.94% Another test was conducted in a full room of the same area having a temperature of 22.67° C. and a relative humidity of 50.35%. The results of those tests are as follows:

| Frequency (Hz) | Full Room Absorption (Metric Sabines) | Percent Uncertainty | Empty Room Absorption (Metric Sabines) | Percent Uncertainty | Absorption Coefficients |
|---|---|---|---|---|---|
| 100 | 5.683 | 6.137 | 5.385 | 4.391 | 0.04 |
| 125 | 6.115 | 5.380 | 5.663 | 3.088 | 0.07 |
| 160 | 6.438 | 4.990 | 5.868 | 2.251 | 0.09 |
| 200 | 6.176 | 4.471 | 5.266 | 2.550 | 0.14 |
| 250 | 6.500 | 4.507 | 5.124 | 2.134 | 0.21 |
| 315 | 7.466 | 4.368 | 5.125 | 1.675 | 0.35 |
| 400 | 8.854 | 4.454 | 5.553 | 1.274 | 0.49 |
| 500 | 9.941 | 4.466 | 5.780 | 1.418 | 0.62 |
| 630 | 11.245 | 4.384 | 6.005 | 1.116 | 0.78 |
| 800 | 12.103 | 4.245 | 6.645 | 1.044 | 0.82 |
| 1000 | 13.074 | 4.223 | 6.960 | 0.928 | 0.91 |
| 1250 | 14.042 | 4.255 | 7.619 | 0.890 | 0.96 |
| 1600 | 15.521 | 4.212 | 8.912 | 0.770 | 0.99 |
| 2000 | 16.804 | 4.263 | 10.019 | 0.770 | 1.01 |
| 2500 | 17.660 | 4.245 | 11.228 | 0.960 | 0.96 |
| 3150 | 19.009 | 4.186 | 12.952 | 0.665 | 0.91 |
| 4000 | 21.173 | 4.169 | 15.623 | 0.604 | 0.83 |
| 5000 | 23.050 | 4.184 | 18.061 | 0.700 | 0.75 |
| | | | | Exact NRC | 0.688 |
| | | | | NRC = | 0.70 |
| | | | | Exact SAA | 0.687 |
| | | | | SAA = | 0.70 |

In another test, the rigid backing board 46 of a panel 40 was oriented to face the sound field in the above-mentioned room wherein the temperatures and humidities were as follows: empty room (22.56° C., 50.94%), full room (22.46° C., 50.35%). The results of such test are as follows:

Another test was conducted in the above-mentioned room wherein the foam material 64 of a preferred panel 60 faced the sound field. The temperatures and humidities were as follows: empty room (22.56° C.,50.94%), full room (22.66° C., 50.35%). The results of such test are as follows:

| Frequency (Hz) | Full Room Absorption (Metric Sabines) | Percent Uncertainty | Empty Room Absorption (Metric Sabines) | Percent Uncertainty | Absorption Coefficients |
|---|---|---|---|---|---|
| 100 | 6.921 | 7.253 | 5.385 | 4.391 | 0.23 |
| 125 | 8.481 | 6.211 | 5.663 | 3.088 | 0.42 |
| 160 | 8.561 | 5.191 | 5.868 | 2.251 | 0.40 |
| 200 | 6.282 | 4.770 | 5.266 | 2.550 | 0.15 |
| 250 | 5.969 | 4.594 | 5.124 | 2.134 | 0.13 |
| 315 | 5.744 | 4.351 | 5.125 | 1.675 | 0.09 |
| 400 | 5.824 | 4.277 | 5.553 | 1.274 | 0.04 |
| 500 | 6.080 | 4.309 | 5.780 | 1.418 | 0.04 |
| 630 | 6.287 | 4.199 | 6.005 | 1.116 | 0.04 |
| 800 | 6.905 | 4.293 | 6.645 | 1.044 | 0.04 |
| 1000 | 7.228 | 4.166 | 6.960 | 0.928 | 0.04 |
| 1250 | 7.806 | 4.232 | 7.619 | 0.890 | 0.03 |
| 1600 | 9.177 | 4.174 | 8.912 | 0.770 | 0.04 |
| 2000 | 10.190 | 4.169 | 10.019 | 0.770 | 0.03 |
| 2500 | 11.287 | 4.229 | 11.228 | 0.960 | 0.01 |
| 3150 | 12.909 | 4.188 | 12.952 | 0.665 | 0.00 |
| 4000 | 15.700 | 4.160 | 15.623 | 0.604 | 0.01 |
| 5000 | 18.266 | 4.171 | 18.061 | 0.700 | 0.03 |
| | | | | Exact NRC | 0.060 |
| | | | | NRC = | 0.05 |
| | | | | Exact SAA | 0.057 |
| | | | | SAA = | 0.05 |

| Frequency (Hz) | Full Room Absorption (Metric Sabines) | Percent Uncertainty | Empty Room Absorption (Metric Sabines) | Percent Uncertainty | Absorption Coefficients |
|---|---|---|---|---|---|
| 100 | 5.668 | 3.741 | 5.385 | 4.391 | 0.04 |
| 125 | 5.880 | 3.385 | 5.663 | 3.088 | 0.03 |
| 160 | 6.497 | 2.679 | 5.868 | 2.251 | 0.09 |

-continued

| Frequency (Hz) | Full Room Absorption (Metric Sabines) | Percent Uncertainty | Empty Room Absorption (Metric Sabines) | Percent Uncertainty | Absorption Coefficients |
|---|---|---|---|---|---|
| 200 | 6.344 | 2.492 | 5.266 | 2.550 | 0.16 |
| 250 | 6.529 | 2.110 | 5.124 | 2.134 | 0.21 |
| 315 | 7.236 | 1.618 | 5.125 | 1.675 | 0.32 |
| 400 | 8.344 | 1.538 | 5.553 | 1.274 | 0.42 |
| 500 | 9.728 | 1.599 | 5.780 | 1.418 | 0.59 |
| 630 | 10.908 | 1.569 | 6.005 | 1.116 | 0.73 |
| 800 | 12.058 | 1.508 | 6.645 | 1.044 | 0.81 |
| 1000 | 12.686 | 1.090 | 6.960 | 0.928 | 0.86 |
| 1250 | 13.598 | 1.202 | 7.619 | 0.890 | 0.89 |
| 1600 | 14.731 | 0.982 | 8.912 | 0.770 | 0.87 |
| 2000 | 15.978 | 0.918 | 10.019 | 0.770 | 0.89 |
| 2500 | 17.257 | 0.923 | 11.228 | 0.960 | 0.90 |
| 3150 | 18.908 | 0.888 | 12.952 | 0.665 | 0.89 |
| 4000 | 21.625 | 0.841 | 15.623 | 0.604 | 0.90 |
| 5000 | 24.042 | 0.648 | 18.061 | 0.700 | 0.89 |
| | | | | Exact NRC | 0.638 |
| | | | | NRC = | 0.65 |
| | | | | Exact SAA = | 0.638 |
| | | | | SAA = | 0.65 |

In another test, the rigid backing board 62 of the panel 60 was oriented to face the sound field in the above-mentioned room wherein the temperatures and humidities were as follows: empty room (22.56° C., 50.94%), fill room (22.48° C., 50.35%). The results of such test are as follows:

| Frequency (Hz) | Full Room Absorption (Metric Sabines) | Percent Uncertainty | Empty Room Absorption (Metric Sabines) | Percent Uncertainty | Absorption Coefficients |
|---|---|---|---|---|---|
| 100 | 6.406 | 5.802 | 5.385 | 4.391 | 0.15 |
| 125 | 8.840 | 3.583 | 5.663 | 3.088 | 0.47 |
| 160 | 9.638 | 3.050 | 5.868 | 2.251 | 0.56 |
| 200 | 6.509 | 2.744 | 5.266 | 2.550 | 0.19 |
| 250 | 5.805 | 1.875 | 5.124 | 2.134 | 0.10 |
| 315 | 5.547 | 1.385 | 5.125 | 1.675 | 0.06 |
| 400 | 5.946 | 1.269 | 5.553 | 1.274 | 0.06 |
| 500 | 6.138 | 1.196 | 5.780 | 1.418 | 0.05 |
| 630 | 6.529 | 1.076 | 6.005 | 1.116 | 0.08 |
| 800 | 7.116 | 1.195 | 6.645 | 1.044 | 0.07 |
| 1000 | 7.499 | 0.880 | 6.960 | 0.928 | 0.08 |
| 1250 | 8.042 | 1.193 | 7.619 | 0.890 | 0.06 |
| 1600 | 9.242 | 0.806 | 8.912 | 0.770 | 0.05 |
| 2000 | 10.327 | 0.814 | 10.019 | 0.770 | 0.05 |
| 2500 | 11.464 | 0.950 | 11.228 | 0.960 | 0.04 |
| 3150 | 13.171 | 0.743 | 12.952 | 0.665 | 0.03 |
| 4000 | 16.035 | 0.746 | 15.623 | 0.604 | 0.06 |
| 5000 | 18.610 | 0.692 | 18.061 | 0.700 | 0.08 |
| | | | | Exact NRC | 0.070 |
| | | | | NRC = | 0.05 |
| | | | | Exact SAA = | 0.074 |
| | | | | SAA = | 0.05 |

As can be appreciated from the foregoing test results, the panels (40, 60) of the present invention have both acoustically reflective and acoustically absorptive characteristics that can be used in preferred methods of the present invention to acoustically tune or sound proof an enclosed area.

Figure 24:
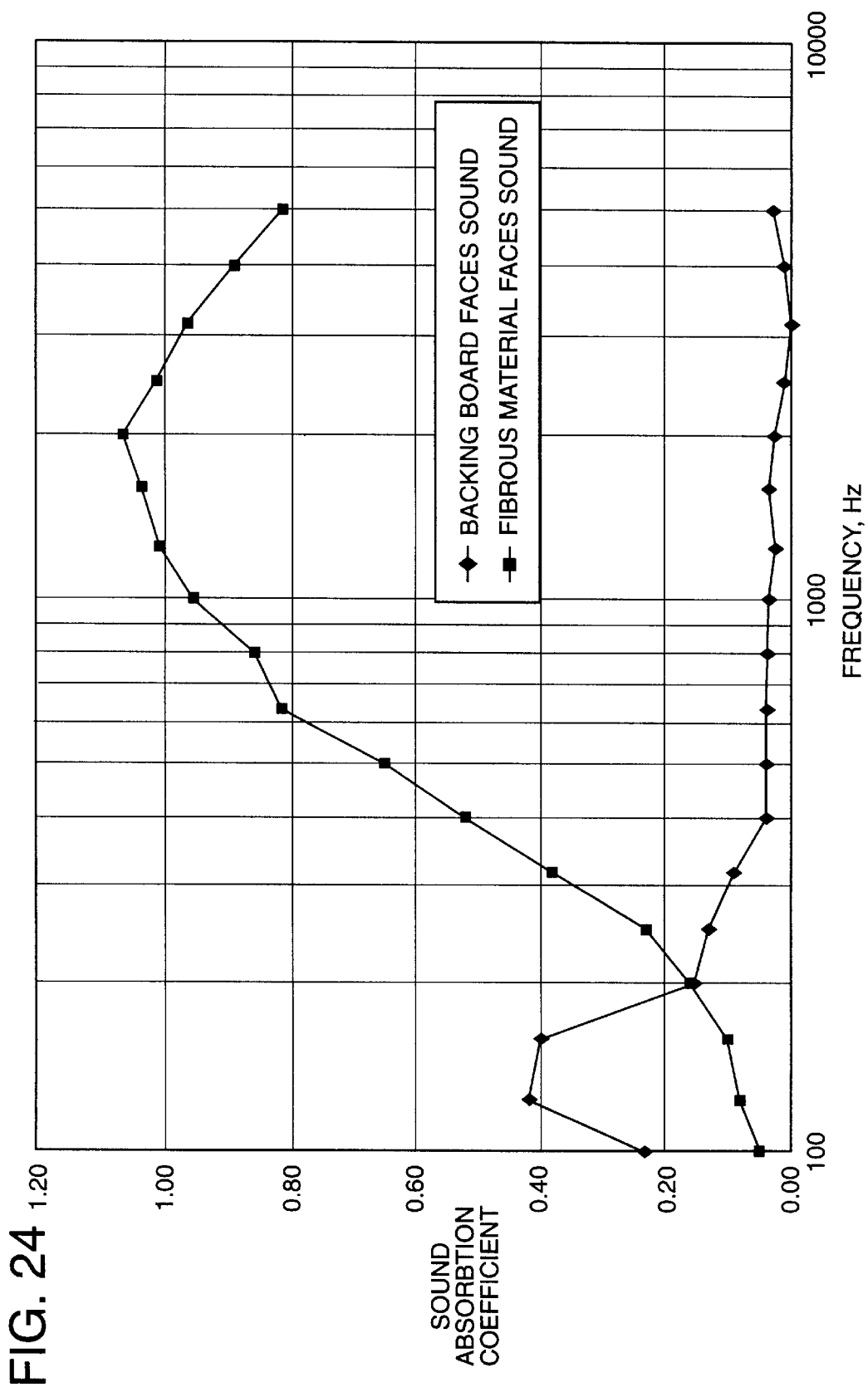
FIG. 24 is a graphical comparison of sound absorption coefficients and sum of the sound absorption coefficients vs. frequency in Hz. for a preferred panel of the subject invention wherein the panel was mounted with its backing board facing toward and away from the source of sound.

FIG. 24 is a chart that sets forth sound absorption coefficients of preferred panel 40 that is exposed to a source of sound at various frequencies. That chart includes the absorption coefficients for a panel that has its backing board facing the sound source and a panel that has its fibrous material facing the sound source. As can be seen from FIG. 24, with the fibrous material facing the sound source, the panel 40 exhibits good acoustical absorbency over the mid-range frequencies of between about 1000 and 4000 Hz. In the low range of frequencies, i.e., below about 300 Hz, the panel 40 is generally acoustically reflective with the fibrous material facing the sound source. Conversely, with the backing board facing the sound source, the panel 40 exhibits good acoustical absorbency over a range of the low range of frequencies, and is generally acoustically reflective over a range of the mid-range of frequencies. Accordingly, desired levels of acoustical absorbency and acoustical reflectivity over a wide range of frequencies can be designed into an acoustical room using the panels 40 in various arrangements of interior-facing surfaces.

Figure 25:
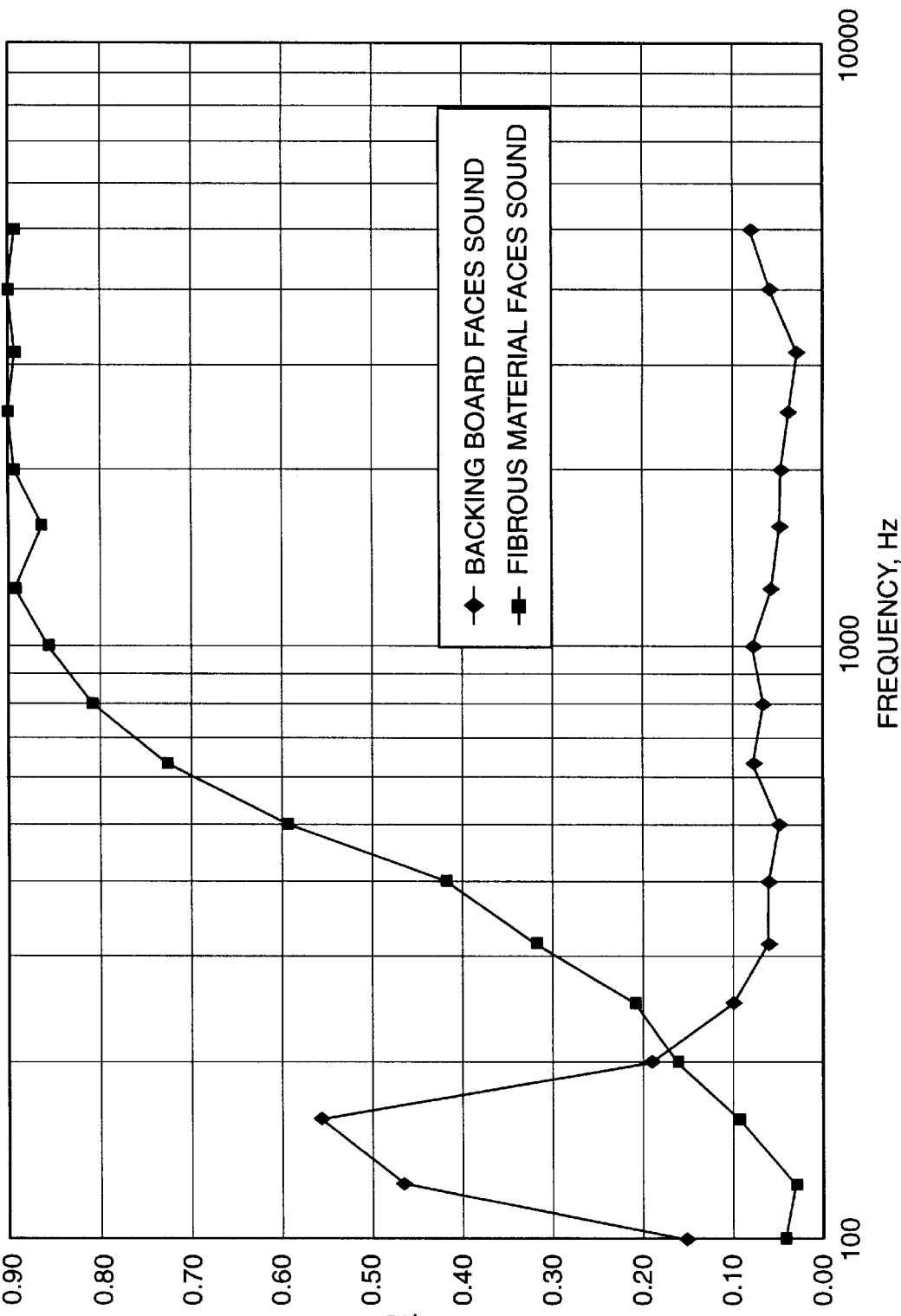
FIG. 25 is a graphical comparison of the sound absorption coefficients and the sum of sound absorption coefficients vs. frequency in Hz for another preferred panel of the subject invention wherein the panel was mounted with its backing board facing toward and away from the source of the sound.

FIG. 25 provides the same data for a preferred panel 60. The information provided in FIGS. 24 and 25 is also provided in the following tables:

| Absorption Coefficients for a preferred panel 40 | | |
| --- | --- | --- |
| Frequency (Hz) | Backing board facing sound | Fibrous material facing sound |
| 100 | 0.23 | 0.05 |
| 125 | 0.42 | 0.08 |
| 160 | 0.40 | 0.10 |
| 200 | 0.15 | 0.16 |
| 250 | 0.13 | 0.23 |
| 315 | 0.09 | 0.38 |
| 400 | 0.04 | 0.52 |
| 500 | 0.04 | 0.65 |
| 630 | 0.04 | 0.82 |
| 800 | 0.04 | 0.86 |
| 1000 | 0.04 | 0.96 |
| 1250 | 0.03 | 1.01 |
| 1600 | 0.04 | 1.04 |
| 2000 | 0.03 | 1.07 |
| 2500 | 0.01 | 1.02 |
| 3150 | 0.00 | 0.96 |
| 4000 | 0.01 | 0.89 |
| 5000 | 0.03 | 0.82 |

| Absorption Coefficients for a Preferred Panel 60 | | |
| --- | --- | --- |
| Freguency (Hz) | Backing Board facing sound | Foam facing sound |
| 100 | 0.15 | 0.04 |
| 125 | 0.47 | 0.03 |
| 160 | 0.56 | 0.09 |
| 200 | 0.19 | 0.16 |
| 250 | 0.10 | 0.21 |
| 315 | 0.06 | 0.32 |
| 400 | 0.06 | 0.42 |
| 500 | 0.05 | 0.59 |
| 630 | 0.08 | 0.73 |
| 800 | 0.07 | 0.81 |
| 1000 | 0.08 | 0.86 |
| 1250 | 0.06 | 0.89 |
| 1600 | 0.05 | 0.87 |
| 2000 | 0.05 | 0.89 |
| 2500 | 0.04 | 0.90 |
| 3150 | 0.03 | 0.89 |
| 4000 | 0.06 | 0.90 |
| 5000 | 0.08 | 0.89 |

Figure 26:
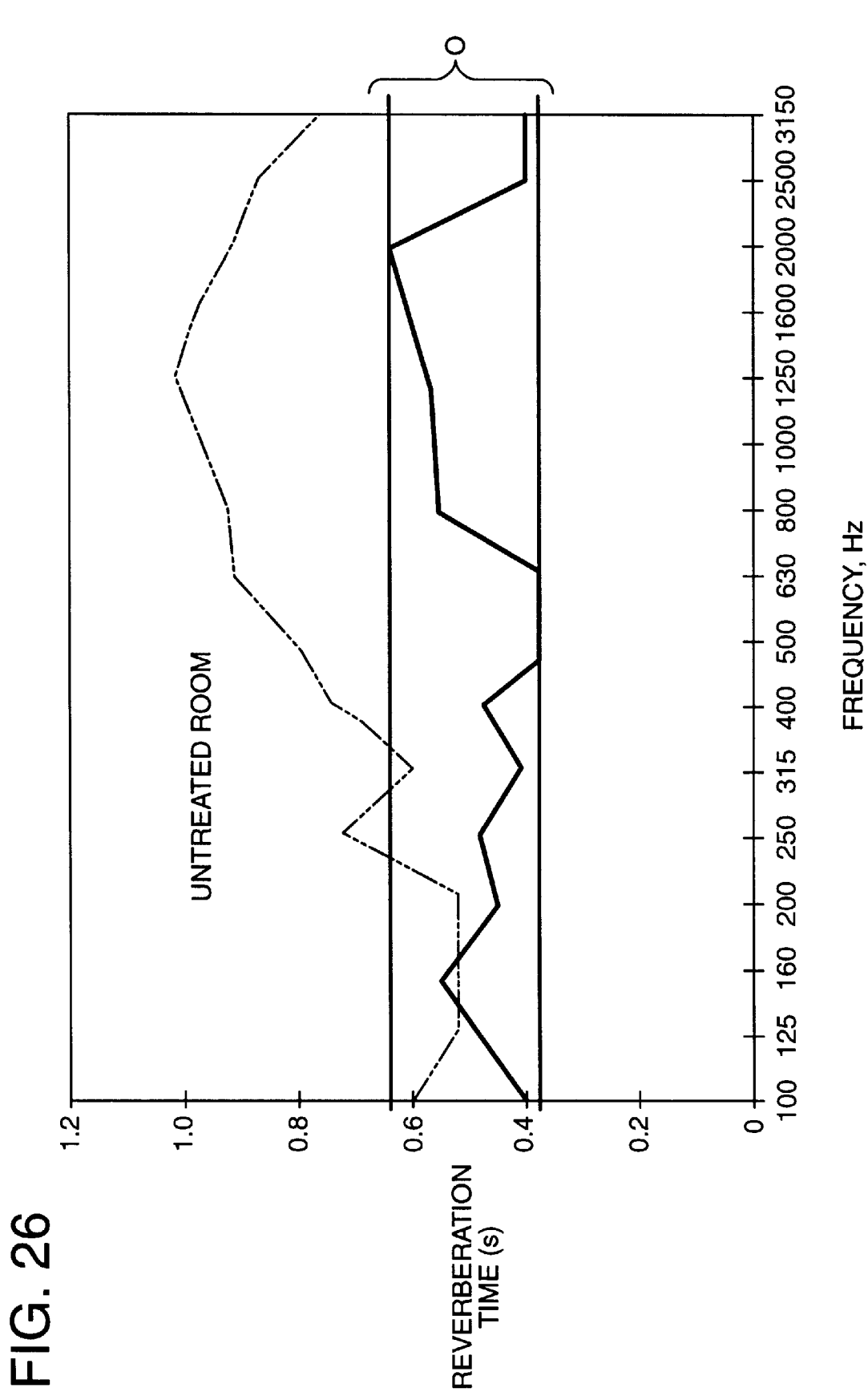
FIG. 26 is a graphical comparison of the reverberation times vs. frequency in Hz for a particular room before and after incorporation of the preferred system of the present invention.

FIG. 26 is a graph of the reverberation time in seconds vs. frequency in Hz before and after a particular room was treated with the acoustical wall treatment system shown in FIG. 14. The room had a volume of 3100 ft$^3$ (__ m$^3$), and is believed to have been at generally ambient conditions, i.e., about 70 degrees F. (__ degrees C.) and about 40–50 percent relative humidity. Before the acoustical wall treatment system of FIG. 14 was applied to the room, the walls of the room were finished, with all four walls having a painted drywall finish. As can be seen from FIG. 26, the reverberation times for many frequencies, especially frequencies in the mid-range of normal human hearing, i.e., 500 to 4000 Hz, were well outside the recommended decay range O. The recommended decay range O for the room was extrapolated from standard curves, such as disclosed by K. B. Ginn, MSc., in Architectural Acoustics, 2d edition, 1978, based upon the room volume and the desired type of test acoustics, which included human speech, music and movie special effects. In contrast, as shown in FIG. 26, the reverberation times for the room after the treatment system shown in FIG. 14 was installed were almost uniformly within the recommended decay range O for the mid-range frequencies. It should be noted that the extrapolation becomes less accurate for the lower low-range frequencies, i.e., less than about 150 Hz, for the particular room tested.

As such, the present invention provides solutions to the aforementioned problems associated with prior acoustical panels and sound trapping equipment. In particular, the panels of the subject invention are economical to produce and install. They are well-adapted for use in commercial installations as well as residential installations. It will be understood, however, that various changes in the details, materials and arrangements of parts which have been herein described and illustrated in order to explain the nature of the invention may be made by those skilled in the art within the principle and scope of the invention as expressed in the appended claims.

What is claimed is:

1. An acoustical diffuser for diffusing sound in a predetermined manner, comprising:

a back board;

a first fibrous material having first and second sides, said first side being attached to a side of said back board and said second side defining a preferred contour;

a first separator layer having first and second sides, said first side attached to said second side of said first fibrous material;

a diffuser material having first and second sides, said first side attached to said second side of said first separator layer;

a second separator layer having first and second sides, said first side attached to said second side of said diffuser material;

a second fibrous material having first and second sides, said first side attached to said second side of said second separator member; and an acoustically transparent member attached to said second side of said second fibrous material.

2. The apparatus of claim 1 wherein said first and second fibrous materials each comprise fiberglass.

3. The apparatus of claim 1 wherein said first and second separator layers each comprise a foil material.

4. The apparatus of claim 1 wherein said diffuser material comprises asphalt.

5. The apparatus of claim 1 wherein said backing board is fabricated from gypsum.

6. The apparatus of claim 1 wherein said acoustically transparent material comprises a material selected from the group of fabric and glass mat.

* * * * *